US012594447B2

(12) United States Patent
Wang et al.

(10) Patent No.: US 12,594,447 B2
(45) Date of Patent: Apr. 7, 2026

(54) FIRE EXTINGUISHING CONTROL METHOD, FIRE EXTINGUISHING SYSTEM, AND FIRE EXTINGUISHING PROTECTION SYSTEM

(71) Applicant: Makeblock Co., Ltd., Shenzhen (CN)

(72) Inventors: Binquan Wang, Shenzhen (CN); Hexiang Gan, Shenzhen (CN); Shangzheng Xie, Shenzhen (CN)

(73) Assignee: MAKEBLOCK CO., LTD., Shenzhen (CN)

( * ) Notice: Subject to any disclaimer, the term of this patent is extended or adjusted under 35 U.S.C. 154(b) by 0 days.

(21) Appl. No.: 18/924,318

(22) Filed: Oct. 23, 2024

(65) Prior Publication Data

US 2025/0041645 A1 Feb. 6, 2025

Related U.S. Application Data

(63) Continuation of application No. PCT/CN2023/134070, filed on Nov. 24, 2023.

(30) Foreign Application Priority Data

Nov. 26, 2022 (CN) ........................ 202211495231.5
Nov. 14, 2023 (CN) ........................ 202311519693.0

(Continued)

(51) Int. Cl.
*A62C 37/40* (2006.01)

(52) U.S. Cl.
CPC .................................. *A62C 37/40* (2013.01)

(58) Field of Classification Search
CPC .................................................. A62C 37/40
See application file for complete search history.

(56) References Cited

U.S. PATENT DOCUMENTS 2,163,501 A * 6/1939 Speicher ................ A01D 46/22 383/41
5,051,595 A * 9/1991 Kern ...................... G08B 17/12 374/161

(Continued)

FOREIGN PATENT DOCUMENTS

CN 104307131 A 1/2015
CN 104460463 A 3/2015

(Continued)

OTHER PUBLICATIONS

International Search Report and Written Opinion dated Feb. 2, 2024 issued in PCT/CN2023/134070.

(Continued)

*Primary Examiner* — Joseph A Greenlund
(74) *Attorney, Agent, or Firm* — Scully, Scott, Murphy & Presser, P.C.

(57) ABSTRACT

A fire extinguishing control method, a fire extinguishing system, and a storage medium are provided. The fire extinguishing protection system includes a fire extinguishing system and a device to be protected. The fire extinguishing system (3) is configured to extinguish a fire in the device to be protected (2). The fire extinguishing system includes a fire extinguishing apparatus. The fire extinguishing control method is applied to the fire extinguishing system. Flame feature data of at least one preset portion of the device to be protected is obtained. A processing mode of the fire extinguishing apparatus is determined according to the flame feature data of the at least one preset portion in the case that presence of a flame is determined according to the flame feature data of the at least one preset portion. The fire extinguishing apparatus is controlled to perform a corresponding operation according to the determined processing mode.

17 Claims, 17 Drawing Sheets

(30) Foreign Application Priority Data

Nov. 14, 2023 (CN) ........................ 202323075734.X
Nov. 20, 2023 (CN) ........................ 202311549799.5

(56) References Cited

U.S. PATENT DOCUMENTS 5,957,354 A * 9/1999 Mentken .................. A45F 3/04 224/601
8,950,643 B2 * 2/2015 Shen ......................... A45F 3/14 224/617
8,960,318 B2 * 2/2015 Munroe ................. A62C 31/12 169/14
9,707,423 B2 * 7/2017 Wagner .................. A62C 3/002
2004/0129434 A1 * 7/2004 Tan ......................... A62C 37/40 239/69
2009/0189773 A1 * 7/2009 Hansen ................ G08B 25/002 340/577
2015/0306438 A1 * 10/2015 Huelsen ............. A62C 99/0018 169/11
2016/0059057 A1 * 3/2016 Disimile ................ A62C 31/05 169/46
2016/0354626 A1 * 12/2016 McNamara .......... A62C 35/023
2019/0070447 A1 * 3/2019 Robin ...................... C08J 9/144
2019/0321668 A1 * 10/2019 Lee ......................... B05B 12/16
2020/0054905 A1 * 2/2020 Livchak ................. G08B 13/19
2020/0346058 A1 * 11/2020 Kempf ................... A62C 35/68
2021/0228926 A1 * 7/2021 Hofmann ............... A62C 37/04
2021/0228927 A1 * 7/2021 Hofmann ............... A62C 37/36
2021/0299499 A1 * 9/2021 Hofmann ............... A62C 37/40
2022/0241634 A1 * 8/2022 Krutskevych .......... G08B 25/04
2022/0347506 A1 * 11/2022 Hofmann ............... A62C 37/04
2023/0124927 A1 * 4/2023 Ezra ....................... A62C 37/40 169/61
2025/0041645 A1 * 2/2025 Wang ....................... A62C 3/00
2025/0213023 A1 * 7/2025 Wang ........................ A45F 3/14

FOREIGN PATENT DOCUMENTS

| | | | |
|---|---|---|---|
| CN | 105816978 | A | 8/2016 |
| CN | 109940289 | A | 6/2019 |
| CN | 110947120 | A | 4/2020 |
| CN | 211929907 | U | 11/2020 |
| CN | 213560613 | U | 6/2021 |
| CN | 114870294 | A | 8/2022 |
| KR | 101346318 | B1 | 12/2013 |
| KR | 101714338 | B1 | 3/2017 |

OTHER PUBLICATIONS

International Search Report and Written Opinion for International Application No. PCT/CN2023/133946 dated Feb. 1, 2024.

* cited by examiner

FIRE EXTINGUISHING CONTROL METHOD, FIRE EXTINGUISHING SYSTEM, AND FIRE EXTINGUISHING PROTECTION SYSTEM

CROSS-REFERENCE TO RELATED APPLICATION(S)

This application is a continuation of International Application No. PCT/CN2023/134070, filed Nov. 24, 2023, which claims priority to Chinese Patent Application No. 202311549799.5, filed Nov. 20, 2023, Chinese Patent Application No. 202323075734.X, filed Nov. 14, 2023, Chinese Patent Application No. 202311519693.0, filed Nov. 14, 2023, and Chinese Patent Application No. 202211495231.5, filed Nov. 26, 2022, the entire disclosures of which are incorporated herein by reference.

TECHNICAL FIELD

The disclosure relates to the field of fire extinguishing technology, and in particular to a fire extinguishing control method, a fire extinguishing system, and a fire extinguishing protection system.

BACKGROUND

For some devices (such as laser cutting and engraving machines) that are prone to fire in operation, it is often necessary for staffs to remain near the devices at all times during operation of these devices. A reason for this is that if a fire occurs but is not extinguished in time, it is easy to cause the fire to spread and a fire disaster to occur, resulting in relatively large property losses.

SUMMARY

In a first aspect, a fire extinguishing control method is provided in the disclosure. The fire extinguishing control method is applied to a fire extinguishing system. The fire extinguishing system includes a fire extinguishing apparatus. The fire extinguishing system is configured to extinguish a fire in a device to be protected. The fire extinguishing control method includes the following. Flame feature data of at least one preset portion of the device to be protected is obtained. A processing mode of the fire extinguishing apparatus is determined according to the flame feature data of the at least one preset portion in response to determining presence of a flame according to the flame feature data of the at least one preset portion. The fire extinguishing apparatus is controlled to perform a corresponding operation according to the determined processing mode.

In a second aspect, a fire extinguishing system is provided in the disclosure. The fire extinguishing system is configured to extinguish a fire in a device to be protected. The fire extinguishing system includes a controller, a flame-feature-data detector, and a fire extinguishing apparatus. The flame-feature-data detector is disposed on each of different portions of the device to be protected. The fire extinguishing apparatus includes an alarm and a fire-extinguishing-gas storage container. Both the flame-feature-data detector and the alarm are in electrical connection with the controller. The fire-extinguishing-gas storage container is in connection with the device to be protected via an air transmission pipe. The controller is configured to obtain flame feature data detected by at least one flame-feature-data detector. The controller is configured to determine a processing mode of the fire extinguishing apparatus according to the flame feature data detected by the at least one flame-feature-data detector, in response to determining presence of a flame according to the flame feature data of the at least one preset portion. The controller is configured to control the fire extinguishing apparatus to perform a corresponding operation.

In a third aspect, a non-transitory computer-readable storage medium is provided in the disclosure. The computer-readable storage medium is configured to store computer programs. The computer programs are configured to be invoked by a controller to implement the following. Flame feature data of at least one preset portion of the device to be protected is obtained. A processing mode of a fire extinguishing apparatus is determined according to the flame feature data of the at least one preset portion in the case that presence of the flame is determined, in response to determining presence of a flame according to the flame feature data of the at least one preset portion. The fire extinguishing apparatus is controlled to perform a corresponding operation according to the determined processing mode.

BRIEF DESCRIPTION OF THE DRAWINGS

In order to describe technical solutions in the disclosure more clearly, the following will give a brief introduction to accompanying drawings required for describing embodiments. Apparently, the accompanying drawings hereinafter described merely illustrate some embodiments of the disclosure. Based on these drawings, those of ordinary skill in the art can also obtain other drawings without creative effort.

DETAILED DESCRIPTION

The technical solutions in embodiments of the disclosure are clearly and completely described hereinafter with reference to accompanying drawings in embodiments of the disclosure. Apparently, the described embodiments are merely part of rather than all of the embodiments of the disclosure. All other embodiments obtained by those of ordinary skill in the art based on the embodiments of the disclosure without creative efforts shall fall within the protection scope of the disclosure.

In description of the specification, unless specified and limited otherwise, terms “connecting” or “coupling” referred to herein may be understood in broader sense, for example, may be a fixed coupling (connection), a detachable coupling (connection), or an integrated coupling (connection); or may be a direct coupling (connection), an indirect coupling (connection) through a medium, or an interconnection between two components; or may be a communication coupling (connection); or may be an electrical coupling (connection). For those of ordinary skill in the art, specific meanings of the above terms in the disclosure may be understood according to specific situations.

Figure 1:
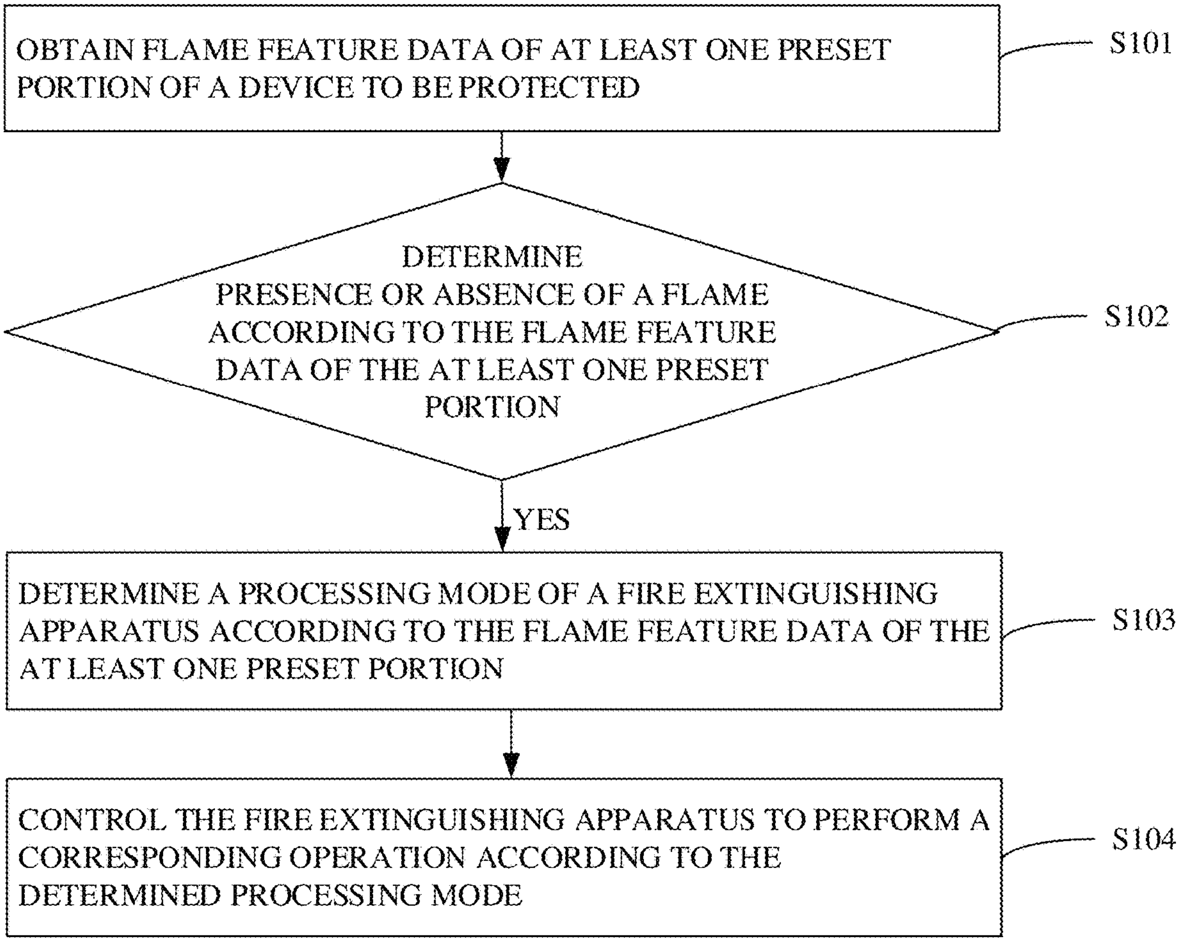
FIG. 1 is a flowchart illustrating a fire extinguishing control method provided in some embodiments of the disclosure.

Refer to FIG. 1, where FIG. 1 is a flowchart illustrating a fire extinguishing control method provided in some embodiments of the disclosure.

The fire extinguishing control method may be applied to a fire extinguishing system, where the fire extinguishing system includes a fire extinguishing apparatus. As illustrated in FIG. 1, the fire extinguishing control method includes the following.

S101, flame feature data of at least one preset portion of a device to be protected is obtained.

The flame feature data may include multiple features of a flame, such as intensity, spectrum, and frequency of a light emitted by the flame, and temperature of the flame.

S102, presence or absence of a flame is determined according to the flame feature data of the at least one preset portion.

In the case that presence of the flame is determined, perform operations at S103 that a processing mode of the fire extinguishing apparatus is determined according to the flame feature data of the at least one preset portion.

S104, the fire extinguishing apparatus is controlled to perform a corresponding operation according to the determined processing mode.

Therefore, through the corresponding operation performed, the staff can detect a fire in time and take corresponding measures to prevent the fire from spreading.

The preset portion is mounted with at least one of a flame sensor or a temperature sensor to obtain the flame feature data.

In some embodiments, the processing mode includes one of alarm generation, alarm generation and fire extinguishing, and fire extinguishing. Therefore, in the case that a flame exists, a nearby staff may be reminded that the device to be protected is on fire and may extinguish the fire by himself, or when there is no staff to extinguish the fire, the fire extinguishing apparatus activates a fire extinguishing function to extinguish the fire to prevent the fire from spreading. Costs of extinguishing the fire by the staff are a bit lower than costs of extinguishing the fire by the fire extinguishing apparatus, and thus not only be the fire prevented from spreading under the premise that the fire extinguishing costs are saved as much as possible, but also the device to be protected is allowed to operate without a staff being on guard.

Furthermore, in some embodiments, the processing mode of the fire extinguishing apparatus may be determined according to the flame feature data in the case that presence of the flame is determined as follows. At least one of a size of the flame or a fire origin location is determined according to the flame feature data in the case that presence of the flame is determined. The processing mode of the fire extinguishing apparatus is determined according to at least one of the determined size of the flame or the determined fire origin location.

In an embodiment, when the size of the flame is in a first preset range of values, it is determined that the processing mode of the fire extinguishing apparatus is alarm generation. When the size of the flame is in a second preset range of values, it is determined that the processing mode of the fire extinguishing apparatus is alarm generation and fire extinguishing. A maximum value in the first preset range of values is less than a minimum value in the second preset range of values.

When the size of the flame is in the first preset range of values, the flame is relatively small, the staff may be reminded by alarm generation to extinguish the fire, and the fire extinguishing apparatus does not have to activate the fire extinguishing function, thereby saving fire extinguishing costs. When the size of the flame is in the second preset range of values, the flame is relatively large, in this case, the staff is reminded of occurrence of the fire by continuous alarm generation, and on the other hand, the fire extinguishing apparatus activates the fire extinguishing function to extinguish the fire, thereby preventing spread of the fire from causing relatively large economic losses.

In another embodiment, when the fire origin location is a core location (e.g., a location where it is easy to further expand the fire), it is determined that the processing mode of the fire extinguishing apparatus is alarm generation and fire extinguishing. When the fire origin location is an edge location (e.g., a location where it is not easy to further expand the fire), it is determined that the processing mode of the fire extinguishing apparatus is alarm generation.

Since the edge location is not easy to further expand the fire, the processing mode is alarm generation, and the staff is reminded to extinguish the fire, thereby saving fire extinguishing costs as much as possible. However, when the fire origin location is a core location, due to the face that the core location is easy to further expand the fire, the processing mode is alarm generation and fire extinguishing, thereby preventing rapid spread of the fire from causing relatively large economic losses.

In yet another embodiment, when the fire origin location is an edge location and the size of the flame is in the first preset range of values, it is determined that the processing mode of the fire extinguishing apparatus is alarm generation. When the fire origin location is a core location and the size of the flame is in the first preset range of values, or when the fire origin location is a core location and the size of the flame is in the second preset range of values, or when the fire origin location is an edge location and the size of the flame is in the second preset range of values, it is determined that the processing mode of the fire extinguishing apparatus is alarm generation and fire extinguishing.

Therefore, when the fire origin location is an edge location and the size of the flame is in the first preset range of values, the staff is reminded by alarm generation to extinguish the fire, thereby saving fire extinguishing costs as much as possible. When the fire origin location is a core location and the size of the flame is in the first preset range of values, or when the fire origin location is a core location and the size of the flame is in the second preset range of values, or when the fire origin location is an edge location and the size of the flame is in the second preset range of values, it is determined that the processing mode of the fire extinguishing apparatus is alarm generation and fire extinguishing, thereby preventing rapid spread of the fire from causing relatively large economic losses.

Furthermore, in some embodiments, the device to be protected includes multiple different preset portions, and the flame feature data of the at least one preset portion of the device to be protected is obtained as follows. Flame feature data of the multiple preset portions of the device to be protected is obtained. At least one of the size of the flame or the fire origin location is determined according to the flame feature data as follows. The size of the flame and the fire origin location is determined according to the flame feature data of the multiple preset portions.

Each preset portion may be provided with at least one of a flame sensor or a temperature sensor. Since impedance values of some flame sensors change as the size of the flame changes, the size of the flame may be determined according to an impedance value (or a current value, or a voltage value). Meanwhile, when there is a flame, an impedance value of a flame sensor that is closer to a location of the flame is smaller, and temperature detected by a temperature sensor that is closer to the location of the flame is higher. Therefore, flame feature data detected by multiple flame sensors and/or temperature sensors may be combined to determine the fire origin location.

Furthermore, in some embodiments, the fire extinguishing control method further includes the following. A dose of flame retardant is determined according to the determined size of the flame in the case that the processing mode includes any one of fire extinguishing and both alarm generation and fire extinguishing. The fire extinguishing apparatus is controlled to perform the corresponding operation according to the determined processing mode and the determined dose of the flame retardant.

Specifically, for example, the fire extinguishing apparatus is provided with four gas cylinders. When the fire extinguishing apparatus is required to extinguish a fire, the number of gas cylinders to be simultaneously opened may be determined according to the size of the flame, thereby ensuring that the flame is completely extinguished.

Furthermore, in some embodiments, the fire extinguishing control method further includes the following. Preset sensitivity level data is obtained, and the processing mode of the fire extinguishing apparatus is determined according to the sensitivity level data and the flame feature data.

For example, the flame is classified into 1-level flame, 2-level flame, 3-level flame, and 4-level flame in size, where 1-level flame>2-level flame>3-level flame>4-level flame. The sensitivity is classified into first-level sensitivity and second-level sensitivity, where the fire extinguishing apparatus in the first-level sensitivity is more sensitive than the fire extinguishing apparatus in the second-level sensitivity. When the fire extinguishing apparatus is in the first-level sensitivity, the processing mode of the fire extinguishing apparatus is alarm generation in response to occurrence of 4-level flame, and the processing mode of the fire extinguishing apparatus is alarm generation and fire extinguishing in response to occurrence of 1-level flame, 2-level flame, or 3-level flame. When the fire extinguishing apparatus is in the second-level sensitivity, the processing mode of the fire extinguishing apparatus is alarm generation in response to occurrence of 3-level flame or 4-level flame, and the processing mode of the fire extinguishing apparatus is alarm generation and fire extinguishing in response to occurrence of 1-level flame or 2-level flame.

According to different needs of users, some users more tend to avoid trouble and thus prefer to directly use the fire extinguishing apparatus to extinguish the fire. In the case that a staff found occurrence of the fire in time, some users prefer that the fire is extinguished by the staff in other ways, thereby reducing fire extinguishing costs. Therefore, levels of sensitivity are set to meet different needs of users.

In some embodiments, the fire extinguishing control method further includes the following. The fire extinguishing apparatus is controlled to extinguish a fire when a one-click fire-extinguishing signal is received.

Regardless of presence or absence of a flame, the fire extinguishing apparatus is controlled to extinguish the fire when the one-click fire-extinguishing signal is received.

In some embodiments, the flame feature data includes flame sensing data, and the flame feature data of the at least one preset portion of the device to be protected is obtained as follows. Flame sensing data of the at least one preset portion of the device to be protected is obtained. The processing mode of the fire extinguishing apparatus is determined according to the flame feature data of the at least one preset portion as follows. Presence or absence of the flame is determined according to the flame sensing data of the at least one preset portion The flame sensing data may be obtained by a flame sensor. Determination of presence or absence of a flame according to the flame sensing data has relatively high accuracy.

The flame sensing data may be obtained through the flame sensor by detecting a series of features related to the flame such as frequency, spectrum, and brightness of a light emitted by the flame.

Furthermore, in some embodiments, presence or absence of the flame is determined according to the flame sensing data of the at least one preset portion as follows. Averaging processing and filtering processing are performed on multiple flame sensing data of each of the at least one preset portion. Presence or absence of the flame is determined according to a maximum value and a minimum value in the processed data.

In some embodiments, averaging processing and filtering processing are performed on the multiple flame sensing data of each of the at least one preset portion as follows. Averaging processing is performed on the multiple flame sensing data of each preset portion to obtain a mean, and filtering processing is performed on means to obtain filtered values.

In some embodiments, presence or absence of the flame is determined according to the maximum value and the minimum value in the processed data as follows. Multiple data subject to averaging processing and filtering processing is plotted into a curve graph, and presence of the flame is determined in the case that a difference between the maximum value and the minimum value in the curve graph is greater than a preset value.

For example, at time T1, the flame sensing data includes A, B, C, D, and E, and X1 is obtained by performing averaging processing on A, B, C, D, and E; at time T2, the flame sensing data includes B, C, D, E, and F, and X2 is obtained by performing averaging processing on B, C, D, E, and F; at time T3, the flame sensing data includes C, D, E, F, and G, and X3 is obtained by performing averaging processing on C, D, E, F, and G; and at time T4, the flame sensing data includes D, E, F, G, and H, and X4 is obtained by performing averaging processing on D, E, F, G, and H; . . . . Filtering processing is performed on X1, X2, X3, X4, . . . , for example, filtered values include X1, X2, X4, X5, and X7. X1, X2, X4, X5, X7, . . . are plotted into a curve graph (similar to a parabolic graph with an opening downward). When a difference between a maximum value and a minimum value in the curve graph corresponding to any time Tx is greater than the preset value, it is determined that a flame exists at time Tx.

In some embodiments, filtering processing is performed on the means as follows. A first filtered value=filter coefficient×calibration data+(1−filter coefficient)×first mean, and an Nth filtered value=filter coefficient×(N−1)th filtered value+(1−filter coefficient)×Nth mean, where N≥2. The calibration data is one flame sensing data selected from multiple flame sensing data in a preset duration after the flame sensing data is stabilized.

In some embodiments, the flame feature data includes flame sensing data and temperature sensing data, and the flame feature data of the at least one preset portion of the device to be protected is obtained as follows. Flame sensing data and temperature sensing data of the at least one preset portion of the device to be protected are obtained. The processing mode of the fire extinguishing apparatus is determined according to the flame feature data of the at least one preset portion as follows. Presence or absence of the flame is determined according to the flame sensing data and the temperature sensing data of the at least one preset portion Determination of presence or absence of a flame according to the flame sensing data and the temperature sensing data may further improve accuracy of determination of presence or absence of a flame.

In some embodiments, presence or absence of the flame is determined according to the flame sensing data and the temperature sensing data of the at least one preset portion as follows. Averaging processing and filtering processing are performed on multiple flame sensing data of each preset portion, and presence or absence of the flame is determined according to a maximum value and a minimum value in the processed data as well as the temperature sensing data.

In some embodiments, the case that averaging processing and filtering processing are performed on the multiple flame sensing data of each preset portion and presence or absence of the flame is determined according to the maximum value and the minimum value in the processed data as well as the temperature sensing data includes the following. Multiple data subject to averaging processing and filtering processing is plotted into a curve graph, and presence of the flame is determined in the case that a difference between a maximum value and a minimum value in the curve graph is greater than a preset value and a temperature value in the temperature sensing data is greater than a preset temperature value.

In some embodiments, averaging processing and filtering processing are performed on the multiple flame sensing data of each preset portion as follows. Averaging processing is performed on the multiple flame sensing data of each preset portion to obtain a mean, filtering processing is performed on means to obtain filtered values, and the multiple filtered values are plotted into a curve graph. Presence of the flame is determined in the case that a difference between a maximum value and a minimum value in the curve graph is greater than the preset value and a temperature value in the temperature sensing data is greater than the preset temperature value.

In some embodiments, the flame feature data includes temperature sensing data, and the flame feature data of the at least one preset portion of the device to be protected is obtained as follows. Temperature sensing data of the at least one preset portion of the device to be protected is obtained.

In some embodiments, the processing mode of the fire extinguishing apparatus is determined according to the flame feature data of the at least one preset portion as follows. Presence or absence of the flame is determined according to the temperature sensing data of the at least one preset portion.

In some embodiments, presence or absence of the flame is determined according to the temperature sensing data of the at least one preset portion as follows. Presence or absence of the flame is determined in the case that a temperature value in the temperature sensing data is greater than the preset temperature value.

In some embodiments, the fire extinguishing apparatus is controlled to perform the corresponding operation according to the determined processing mode as follows. In the case that the determined processing mode is alarm generation and fire extinguishing, an alarm is generated for a preset duration, and the fire extinguishing apparatus is controlled to perform fire extinguishing in response to no reception of a fire-extinguishing canceling signal within the preset duration. In this way, time can be reserved for a user to confirm whether there is a misjudgment, and if there is no misjudgment, the user may also choose to cancel fire extinguishing carried out with the fire extinguishing apparatus, and extinguish the fire by himself in other manners.

Furthermore, in other embodiments, the fire extinguishing apparatus is controlled to perform the corresponding operation according to the determined processing mode as follows. In the case that the determined processing mode is alarm generation and fire extinguishing, the alarm is generated and the fire extinguishing apparatus is controlled to perform fire extinguishing. In this way, fire extinguishing is performed relatively timely, and the fire can be quickly prevented from spreading.

Figure 2:
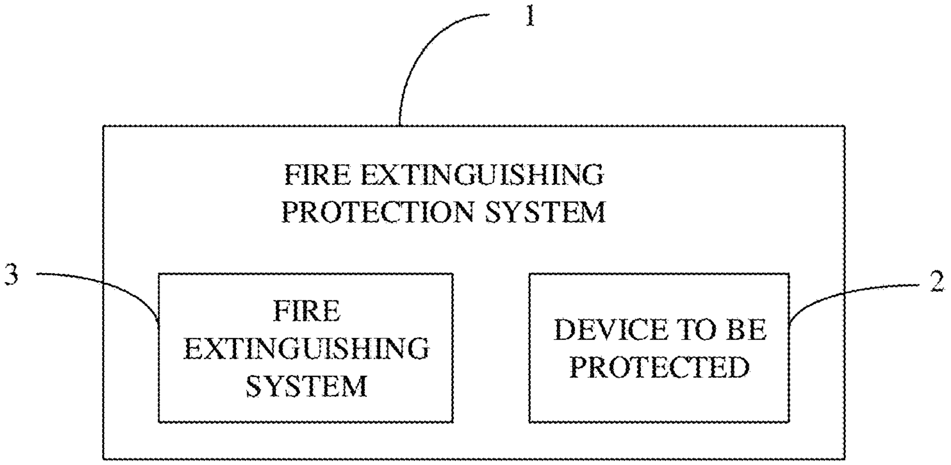
FIG. 2 is a structural block view of a fire extinguishing protection system provided in some embodiments of the disclosure.

Refer to FIG. 2, where FIG. 2 is a structural block view of a fire extinguishing protection system provided in some embodiments of the disclosure.

As illustrated in FIG. 2, the fire extinguishing protection system 1 includes a fire extinguishing system 3 and a device to be protected 2. The fire extinguishing system 3 may be configured to extinguish a fire in the device to be protected 2, and/or may be configured to generate an alarm for reminding when a fire occurs in the device to be protected 2. The device to be protected 2 may be a device prone to fire in operation. In some embodiments, the device to be protected 2 is a laser cutting and engraving machine. When the laser cutting and engraving machine is in operation, high-temperature cutting of a plate may easily cause an open fire.

Figure 3:
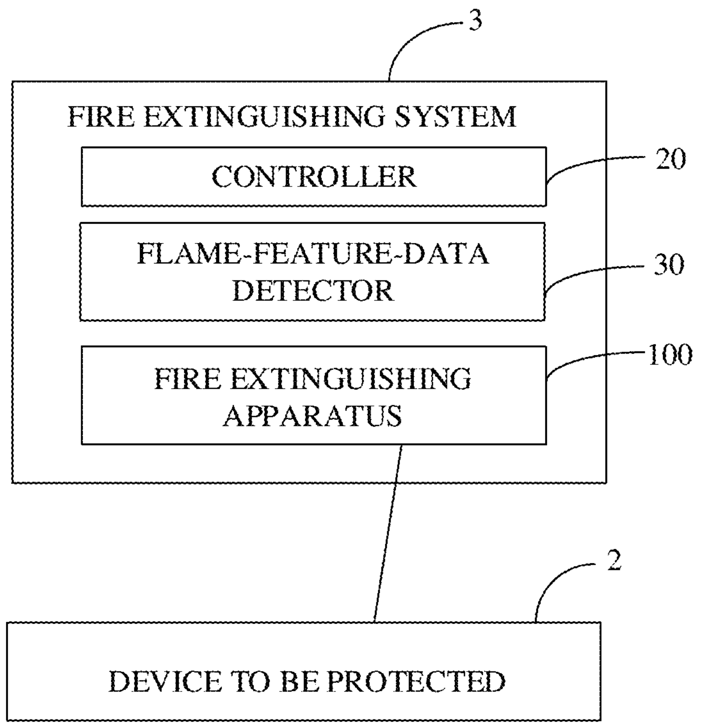
FIG. 3 is a structural block view of a fire extinguishing system and a device to be protected provided in some embodiments of the disclosure.

Refer to FIG. 3, where FIG. 3 is a structural block view of a fire extinguishing system and a device to be protected provided in some embodiments of the disclosure.

As illustrated in FIG. 3, in some embodiments, the fire extinguishing system 3 includes a controller 20, a fire extinguishing apparatus 100, and a flame-feature-data detector 30. The flame-feature-data detector 30 is disposed on each of different portions of the device to be protected 2. Both the flame-feature-data detector 30 and the fire extinguishing apparatus 100 are in electrical connection with the controller 20. The controller 20 is configured to obtain flame feature data detected by at least one flame-feature-data detector 30. The controller 20 is further configured to determine presence or absence of a flame according to the flame feature data. In response to presence of the flame, the controller 20 is configured to determine a processing mode of the fire extinguishing apparatus 100 according to the flame feature data detected by the at least one flame-feature-data detector 30 and control the fire extinguishing apparatus 100 to perform a corresponding operation.

In the disclosure, the flame-feature-data detector 30 mounted on the device to be protected 2 detects whether a flame is generated in the device to be protected 2. The controller 20 in the fire extinguishing system 3 is in electrical connection with the flame-feature-data detector 30 in the fire extinguishing system 3 to obtain the flame feature data detected by the flame-feature-data detector 30. The controller 20 determines presence or absence of a flame according to the flame feature data detected by the at least one flame-feature-data detector 30. In response to presence of the flame, the controller 20 controls the fire extinguishing apparatus 100 to perform the corresponding operation. As such, a staff may detect a fire in time and take corresponding measures to prevent the fire from spreading.

Figure 4:
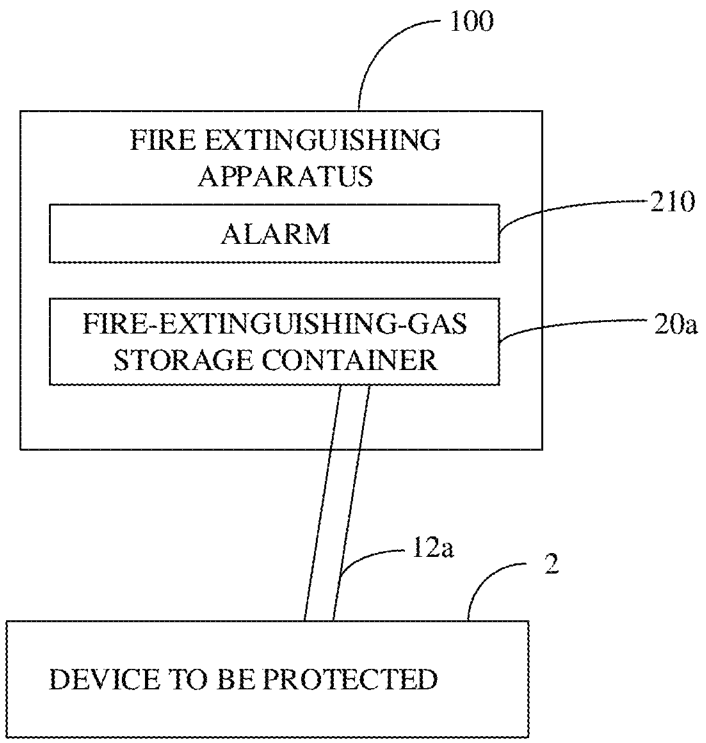
FIG. 4 is a structural block view of a fire extinguishing apparatus and a device to be protected provided in some embodiments of the disclosure.

Refer to FIG. 4, where FIG. 4 is a structural block view of a fire extinguishing apparatus and a device to be protected provided in some embodiments of the disclosure.

In some embodiments that are similar to the foregoing embodiments, a difference therebetween is that the processing mode includes one of alarm generation, alarm generation and fire extinguishing, and fire extinguishing. As illustrated in FIG. 4, the fire extinguishing apparatus 100 further includes an alarm 210 and a fire-extinguishing-gas storage container 20*a*. The fire-extinguishing-gas storage container 20*a* is connected to the device to be protected 2 through an air pipe 12*a*. When a flame exists, the controller 20 is configured to control the fire-extinguishing-gas storage container 20*a* to be open to allow a fire extinguishing gas to enter the device to be protected 2 to extinguish a fire in the device to be protected 2, and/or configured to control the alarm 210 to generate an alarm.

When presence of a flame is determined, the controller 20 determines the fire extinguishing apparatus 100 to perform at least one of alarm generation or fire extinguishing according to the flame feature data detected by the at least one flame-feature-data detector 30. The controller 20 controls the fire-extinguishing-gas storage container 20*a* to be open to allow the extinguishing gas to enter the device to be protected 2 to extinguish a fire in the device to be protected 2, and/or controls the alarm 210 to generate an alarm. As such, the nearby staff may be reminded that the device to be protected 2 is on fire. The staff may extinguish the fire by himself, or when there is no staff to extinguish the fire, the fire extinguishing apparatus 100 activates the fire extinguishing function to extinguish the fire to prevent the fire from spreading. Costs on that the staff extinguishes the fire by himself are a bit lower than costs of extinguishing the fire by the fire extinguishing apparatus 100, and thus not only be the fire prevented from spreading under the premise that the fire extinguishing costs is saved as much as possible, but also the device to be protected 2 is allowed to operate without a staff being on guard.

Figure 5:
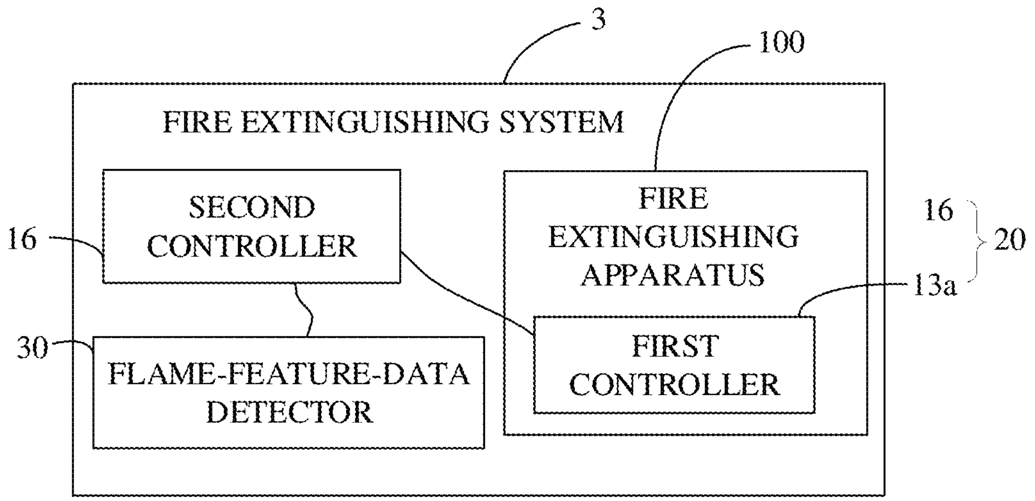
FIG. 5 is a structural block view of a fire extinguishing system provided in some embodiments of the disclosure.

Refer to FIG. 5, where FIG. 5 is a structural block view of a fire extinguishing system provided in some embodiments of the disclosure.

As illustrated in FIG. 5, in some embodiments, the controller 20 includes a first controller 13*a* and a second controller 16. The first controller 13*a* 6 is disposed inside the fire extinguishing apparatus 100, and the second controller 16 is independent from the fire extinguishing apparatus 100 and disposed outside the fire extinguishing apparatus 100. The alarm 210 is in connection with the first controller 13*a*. The flame-feature-data detector 30 is in connection with the second controller 16. The first controller 13*a* is in connection with the second controller 16. The second controller 16 is configured to obtain flame feature data detected by at least one flame-feature-data detector 30 and determine presence or absence of a flame according to the flame feature data. The first controller 13*a* is configured to receive a processed result from the second controller 16 and control the fire extinguishing apparatus 100 to perform a corresponding operation according to the processed result. The processed result may be a determined result of presence or absence of a flame or a determined processing mode of the fire extinguishing apparatus 100. That is, determination of the processing mode of the fire extinguishing apparatus 100 according to the flame feature data detected by the at least one flame-feature-data detector 30 may be processed by the first controller 13*a* or the second controller 16.

In some other embodiments, there may be only one controller 20, which may be disposed inside the fire extinguishing apparatus 100, or may be independent from the fire extinguishing apparatus 100 and disposed outside the fire extinguishing apparatus 100.

Furthermore, as illustrated in FIG. 4, the fire extinguishing apparatus 100 further includes the alarm 210 and the fire-extinguishing-gas storage container 20*a*. The fire-extinguishing-gas storage container 20*a* is connected to the device to be protected 2 through the air pipe 12*a*. When a flame exists, the controller 20 is configured to control the fire-extinguishing-gas storage container 20*a* to be open to allow the fire extinguishing gas to enter the device to be protected 2 to extinguish a fire in the device to be protected 2, and/or configured to control the alarm 210 to generate an alarm.

Furthermore, in some embodiments, when presence of a flame is determined, the controller 20 is configured to determine at least one of a size of the flame or a fire origin location according to the flame feature data, and determine the processing mode of the fire extinguishing apparatus 100 according to at least one of the determined size of the flame or the determined fire origin location.

Furthermore, in some embodiments, the controller 20 is configured to obtain flame feature data of multiple flame-feature-data detectors 30 of the device to be protected 2, and determine the size of the flame and the fire origin location according to the flame feature data of the multiple flame-feature-data detectors 30.

Furthermore, in some embodiments, the controller 20 is configured to determine a dose of flame retardant according to the determined size of the flame in the case that the processing mode includes any one of fire extinguishing and both alarm generation and fire extinguishing, and control the fire extinguishing apparatus 100 to perform the corresponding operation according to the determined processing mode and the determined dose of the flame retardant.

Furthermore, in some embodiments, the controller 20 is configured to obtain preset sensitivity level data, and determine the processing mode of the fire extinguishing apparatus 100 according to the sensitivity level data and the flame feature data.

As illustrated in FIG. 4 and FIG. 5, in some embodiments, the fire extinguishing apparatus 100 is provided with a one-click fire-extinguishing button (not illustrated). In response to reception of a one-click fire-extinguishing signal when the one-click fire extinguishing button is pressed, the controller 20 controls the fire-extinguishing-gas storage container 20*a* to be open to allow the fire extinguishing gas to enter the device to be protected 2 to extinguish a fire in the device to be protected 2.

Figure 6:
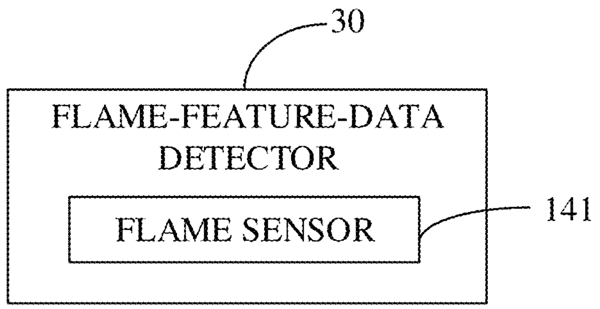
FIG. 6 is a structural block view of a flame-feature-data detector provided in some embodiments of the disclosure.

Refer to FIG. 5 and FIG. 6 together, where FIG. 6 is a structural block view of a flame-feature-data detector provided in some embodiments of the disclosure.

As illustrated in FIG. 5 and FIG. 6, in some embodiments, the flame-feature-data detector 30 includes a flame sensor 141. The flame sensor 141 is configured to obtain flame sensing data. The controller 20 is configured to obtain the flame sensing data of the at least one preset portion of the device to be protected 2, and determine presence or absence of a flame according to the flame sensing data of the at least one preset portion.

The flame sensor 141 may be, but is not limited to, an infrared flame sensor. The infrared flame sensor has a feature of being very sensitive to infrared rays emitted by the flame. When brightness of the flame increases, infrared rays emitted increase, and impedance between pins of the infrared flame sensor decreases. When the brightness of the flame decreases, the infrared rays emitted decrease, and the impedance between the pins of the infrared flame sensor increases.

Furthermore, in some embodiments, the controller 20 is configured to perform averaging processing and filtering processing on multiple flame sensing data of each preset portion, and determine presence or absence of a flame according to a maximum value and a minimum value in the processed data.

In some embodiments, the controller 20 is configured to perform averaging processing on the multiple flame sensing data of each flame sensor 141 to obtain a mean, perform filtering processing on means to obtain filtered values, and plot the multiple data subject to averaging processing and filtering processing into a curve graph. When a difference between a maximum value and a minimum value in the curve graph is greater than the preset value, the controller 20 is configured to determine presence of the flame.

Furthermore, in some embodiments, a first filtered value=filter coefficient×calibration data+(1−filter coefficient)×first mean, and an Nth filtered value=filter coefficient×(N−1)th filtered value+(1−filter coefficient)×Nth mean, where $N \geq 2$. The calibration data is one flame sensing data selected from multiple flame sensing data in a preset duration after the flame sensing data is stabilized.

Figure 7:
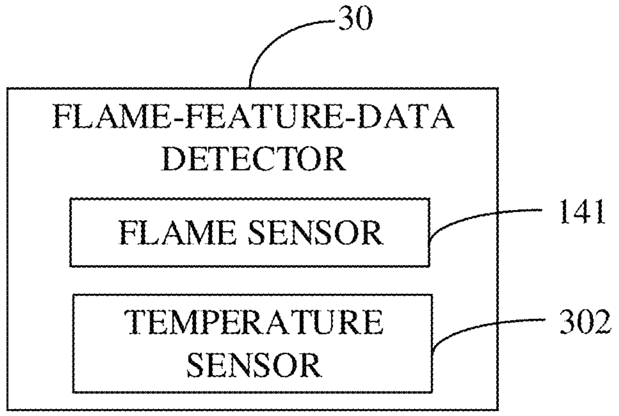
FIG. 7 is a structural block view of a flame-feature-data detector provided in some other embodiments of the disclosure.

Refer to FIG. 5 and FIG. 7 together, where FIG. 7 is a structural block view of a flame-feature-data detector provided in some other embodiments of the disclosure.

As illustrated in FIG. 5 and FIG. 7, furthermore, in some other embodiments, the flame-feature-data detector 30 includes the flame sensor 141 and a temperature sensor 302. The controller 20 is connected to the flame sensor 141 and the temperature sensor 302. The flame sensor 141 is configured to obtain flame sensing data, and the temperature sensor 302 is configured to obtain temperature sensing data. The controller 20 is configured to obtain flame sensing data and temperature sensing data of the at least one preset portion of the device to be protected 2, and determine presence or absence of a flame according to both the flame sensing data and the temperature sensing data of the at least one preset portion.

The controller 20 determines presence or absence of a flame according to the flame sensing data and the temperature sensing data, which can increase accuracy of determination as compared to determination of presence or absence of a flame according to the flame feature data alone.

As illustrated in FIG. 5, the controller 20 may be the second controller 16 independent from the fire extinguishing apparatus 100 and disposed outside the fire extinguishing apparatus 100.

Furthermore, in some embodiments, the controller 20 is configured to perform averaging processing and filtering processing on multiple flame sensing data of each preset portion, and determine presence or absence of a flame according to a maximum value and a minimum value in the processed data as well as the temperature sensing data.

Furthermore, in some embodiments, the controller 20 is configured to perform averaging processing on the multiple flame sensing data of each flame sensor 141 to obtain a mean, perform filtering processing on means to obtain filtered values, and plot the multiple data subject to averaging processing and filtering processing into a curve graph. When a difference between a maximum value and a minimum value in the curve graph is greater than the preset value, and when a temperature value in the temperature sensing data is greater than a preset temperature value, the controller 20 is configured to determine presence of the flame.

Furthermore, in some embodiments, when it is determined that the processing mode is alarm generation and fire extinguishing, the controller 20 is configured to control the alarm 210 to generate an alarm for a preset duration, and control the fire-extinguishing-gas storage container 20*a* to be open to allow the extinguishing gas to enter the device to be protected 2 to extinguish the fire in the device to be protected 2 in response to no reception of a fire-extinguishing canceling signal within the preset duration. Optionally, when it is determined that the processing mode is alarm generation and fire extinguishing, the controller 20 is configured to control the alarm 210 to generate an alarm and control the fire-extinguishing-gas storage container 20*a* to be open to allow the extinguishing gas to enter the device to be protected 2 to extinguish the fire in the device to be protected 2.

Figure 8:
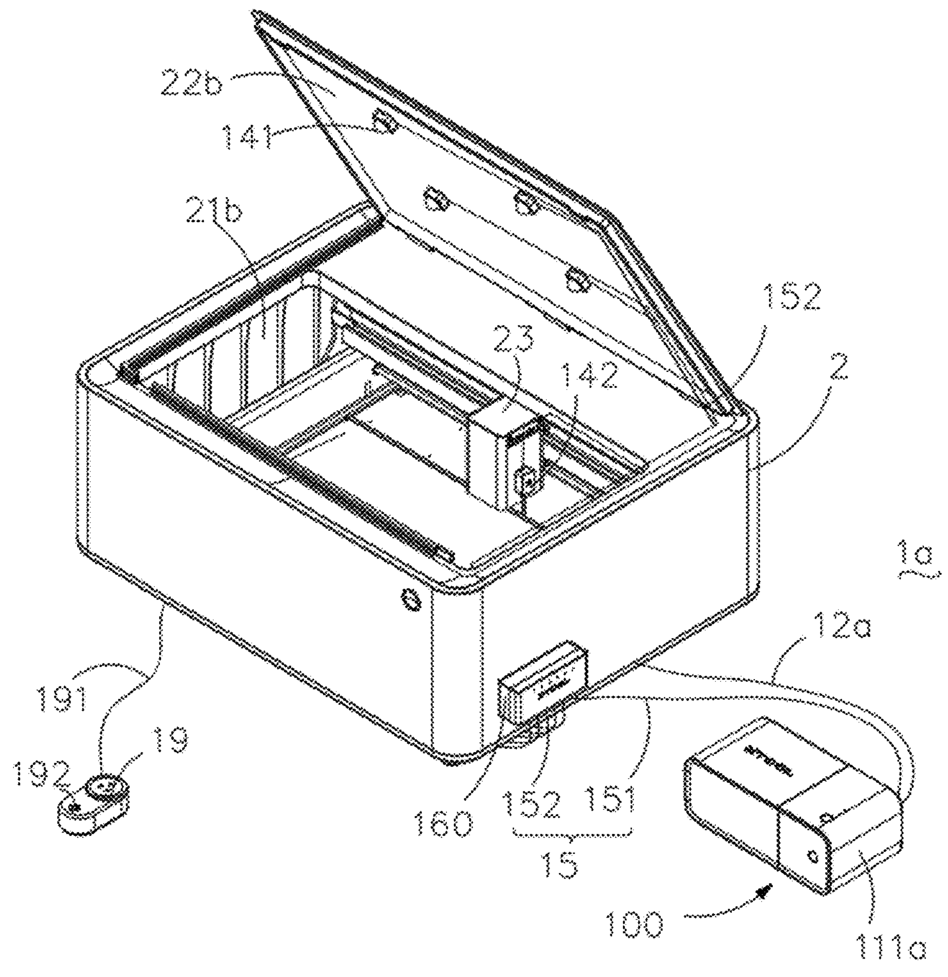
FIG. 8 is a schematic structural view of a fire extinguishing system in an embodiment of the disclosure.
Figure 9:
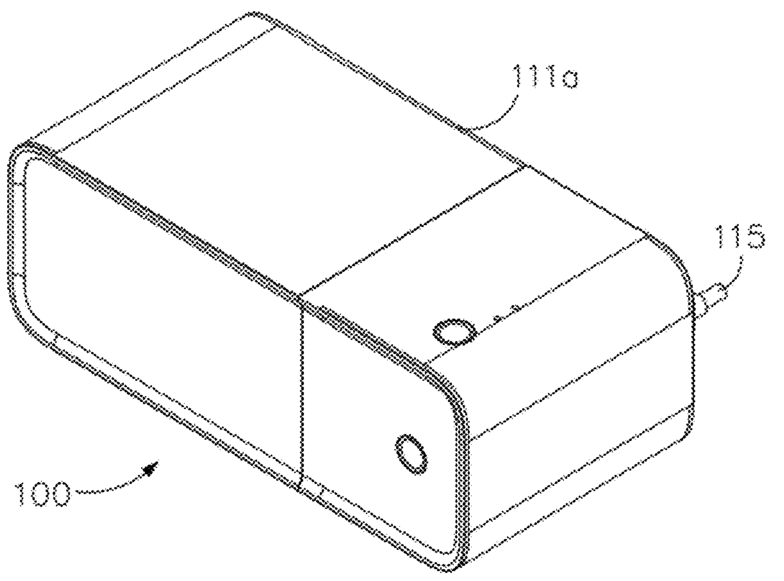
FIG. 9 is a schematic perspective structural view of a fire extinguishing apparatus in an embodiment of the disclosure.
Figure 10:
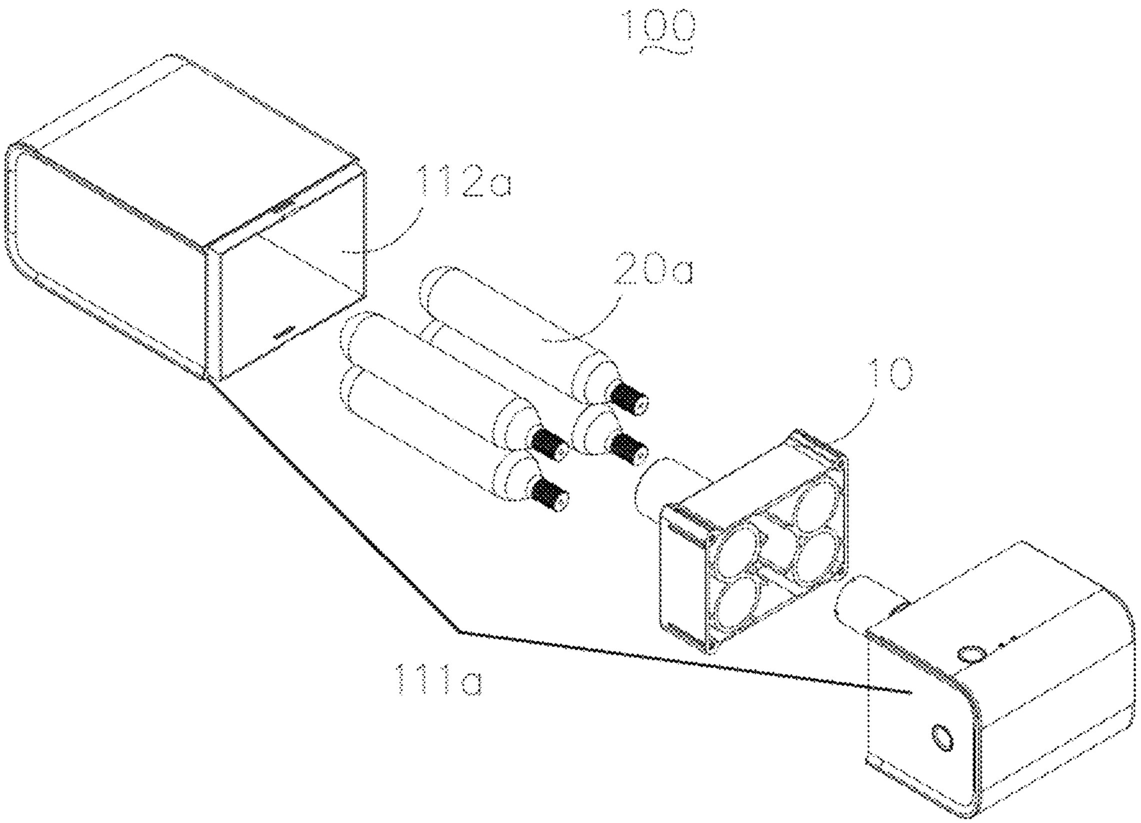
FIG. 10 is an exploded schematic view of a fire extinguishing apparatus in an embodiment of the disclosure.
Figure 11:
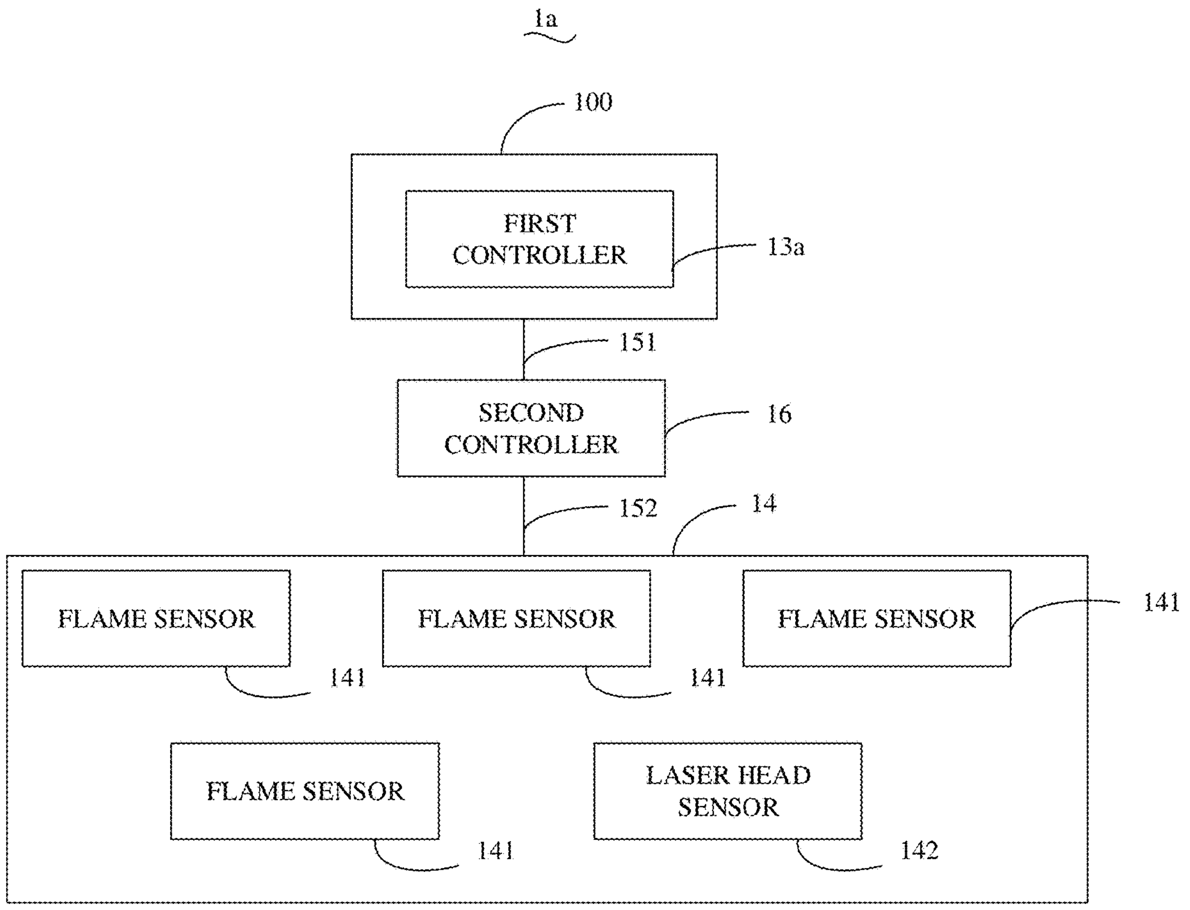
FIG. 11 is a schematic view of modules of a fire extinguishing system in an embodiment of the disclosure.

Refer to FIGS. 8 to 11, where FIG. 8 is a schematic structural view of an external fire extinguishing system 1*a* in an embodiment of the disclosure, FIG. 9 is a schematic perspective structural view of a fire extinguishing apparatus 100 in an embodiment of the disclosure, FIG. 10 is an exploded schematic view of a fire extinguishing apparatus 100 in an embodiment of the disclosure, and FIG. 11 is a schematic view of modules of an external fire extinguishing system 1*a* in an embodiment of the disclosure.

As illustrated in FIG. 8, the external fire extinguishing system 1*a* includes a fire extinguishing apparatus 100, an air pipe 12*a*, a first controller 13*a* (as illustrated in FIG. 11), and a sensor 14 (as illustrated in FIG. 11). As illustrated in FIG. 9, the fire extinguishing apparatus 100 defines an air outlet 115. As illustrated in FIG. 8, one end of the air pipe 12*a* is in communication with the air outlet 115, and the other is in communication with a working region 21*b* of the device to be protected 2. The first controller 13*a* is in electrical connection with the fire extinguishing apparatus 100. The sensor 14 is disposed within the working region 21*b* of the device to be protected 2 and is in communication connection with the first controller 13*a*. When the first controller 13*a* determines that there is a fire in the device to be protected 2 according to sensing data obtained by the sensor 14, the first controller 13*a* controls the fire extinguishing apparatus 100 to release the fire extinguishing gas, and the fire extinguishing gas enters the device to be protected 2 through the air pipe 12*a* to extinguish the fire.

Therefore, in the disclosure, the device to be protected 2 may be, but is not limited to, a laser engraving device, a laser cutting device, and the like. The fire extinguishing apparatus 100 is disposed outside the device to be protected 2. The fire extinguishing apparatus 100 is connected to the device to be protected 2 through the air pipe 12*a*. The sensor 14 is disposed within the working region 21*b* of the device to be protected 2 and can obtain the sensing data by detecting flame information in the device to be protected 2 in real time. When the first controller 13*a* determines that there is a fire in the device to be protected 2 according to the sensing data obtained by the sensor 14, the first controller 13*a* controls the fire extinguishing apparatus 100 to release the fire extinguishing gas, and the fire extinguishing gas enters the device to be protected 2 through the air pipe 12*a* to extinguish the fire, which can realize automatic fire extinguishing. Compared with a built-in fire extinguishing mode of the device to be protected 2, the external fire extinguishing system 1*a* of the disclosure is disposed more flexibly, so that an overall size of the device to be protected 2 may be reduced, and the external fire extinguishing system 1*a* can be compatible with different types of the device to be protected 2 and thus has a relatively high compatibility.

Figure 12:
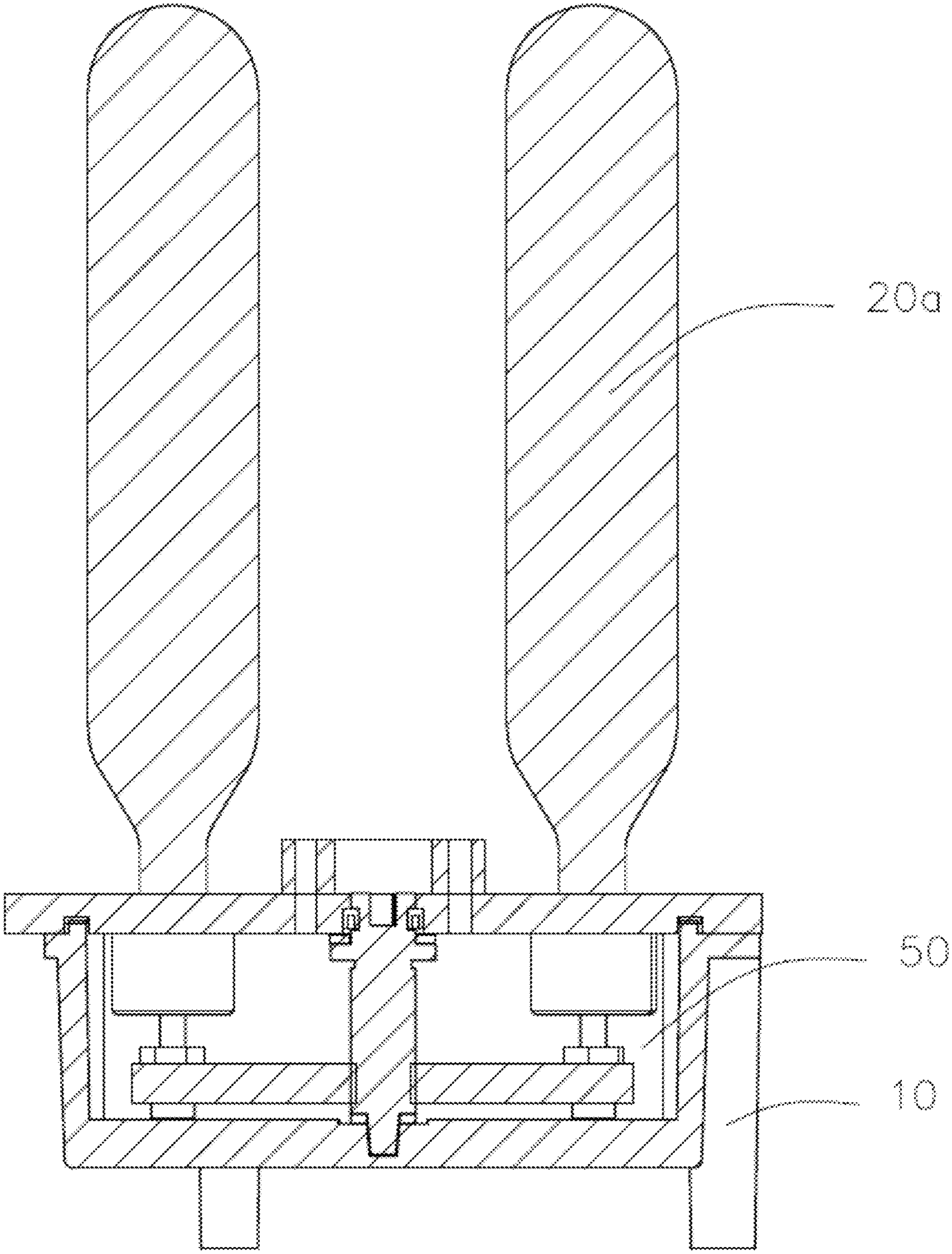
FIG. 12 is a schematic cross-sectional view of an assembly of a piercing apparatus and a gas cylinder of a fire extinguishing apparatus in an embodiment of the disclosure.

In some embodiments, referring to FIG. 12, the fire extinguishing apparatus 100 includes the fire-extinguishing-gas storage container 20*a* and a piercing apparatus 10. A receiving cavity 50 is defined within the piercing apparatus 10. A preset portion of the fire-extinguishing-gas storage container 20*a* extends through and is fixed to the piercing apparatus 10, and the air outlet 115 is in internal connection with the receiving cavity 50.

A body of the fire-extinguishing-gas storage container 20*a* is located outside the receiving cavity 50, which can reduce a volume of the receiving cavity 50, and is conducive for the fire extinguishing gas formed by a fire extinguishing agent in the fire-extinguishing-gas storage container 20*a* to quickly fill the receiving cavity 50 and flow out from the receiving cavity 50 to extinguish the fire. Meanwhile, the body of the fire-extinguishing-gas storage container 20*a* is located outside the receiving cavity 50, so that when the fire-extinguishing-gas storage container 20*a* is replaced, the fire-extinguishing-gas storage container 20*a* can be replaced directly at the outside of the receiving cavity 50, and the piercing apparatus 10 does not need to be disassembled for replacing of the fire-extinguishing-gas storage container 20*a*.

As illustrated in FIG. 9, in some embodiments, the fire extinguishing apparatus 100 has an external housing 111*a*. As illustrated in FIG. 10, an accommodating cavity 112*a* is defined in the external housing 111*a*. The fire-extinguishing-gas storage container 20*a* and the piercing apparatus 10 are located in the accommodating cavity 112*a*, and the air outlet 115 is defined on the external housing 111*a*. The air outlet 115 is in internal communication with the accommodating cavity 112*a*. The air pipe 12*a* may be plugged into the air outlet 115. It may be understood that pressure of the fire extinguishing agent stored in the fire-extinguishing-gas storage container 20*a* is greater than pressure in the accommodating cavity 112*a*, and when the fire-extinguishing-gas storage container 20*a* is pierced, the fire extinguishing agent in the fire-extinguishing-gas storage container 20*a* is released into the accommodating cavity 112*a* and sublimated to form a fire extinguishing gas. In other embodiments, the air pipe 12*a* may pass through the air outlet 115 to enter the accommodating cavity 112*a* and to be in direct connection with the receiving cavity 50 of the piercing apparatus 10. Therefore, the gas in the fire-extinguishing-gas storage container 20*a* is ejected directly through the air pipe 12*a*.

In some embodiments, the fire extinguishing agent in the fire-extinguishing-gas storage container 20*a* may be, but is not limited to, carbon dioxide, heptafluoropropane, trifluoromethane, hexafluoropropane, and the like. In this embodiment, the fire extinguishing agent in the fire-extinguishing-gas storage container 20*a* is carbon dioxide. In other embodiments, the fire extinguishing agent in the fire-extinguishing-gas storage container 20*a* may be other inert gases. In some embodiments, the fire-extinguishing-gas storage container 20*a* may be implemented as one or more fire-extinguishing-gas storage containers, and the piercing apparatus 10 acts as a mounting bracket for the one or more fire-extinguishing-gas storage containers 20*a*. When piercing is required, the piercing apparatus 10 pierces the one or more fire-extinguishing-gas storage containers 20*a* simultaneously, and fire extinguishing agents flow out from pierced gaps of the fire-extinguishing-gas storage containers 20*a* to fill the accommodating cavity 112*a* and enter the device to be protected 2 through the air pipe 12*a* to extinguish the fire.

In some embodiments, the sensor 14 is disposed on an inner wall of the working region 21*b* of the device to be protected 2. In other embodiments, the sensor 14 may be disposed within the working region 21*b* of the device to be protected 2 via an intermediate element.

In some embodiments, referring to FIG. 8, the sensor 14 includes a flame sensor 141. The flame sensor 141 is configured to obtain flame sensing data, and the first controller 13*a* determines whether there is a fire in the device to be protected 2 according to the flame sensing data obtained by the flame sensor 141.

In some embodiments, the flame sensor 141 is implemented as at least four flame sensors 141, and the four flame sensors 141 are spaced apart at different locations on the inner wall of the working region 21*b* of the device to be protected 2, so that presence or absence of a fire can be determined according to the flame sensing data obtained by the flame sensors 141 at different locations from different angles.

In some embodiments, the four flame sensors 141 are spaced apart at four diagonal locations on a top wall 22*b* of the working region 21*b* of the device to be protected 2, so that presence or absence of a fire can be determined according to the flame sensing data obtained by the flame sensors 141 at different locations from different angles.

In some embodiments, each flame sensor 141 has a cone-shaped detection range and obtains flame sensing data within a preset distance range. When the flame sensing data obtained by each flame sensor 141 is greater than a preset value, it is determined that a flame occurs within the preset distance range of that flame sensor 141. The four flame sensors 141 are spaced apart at four diagonal locations on the top wall 22*b* of the working region 21*b* of the device to be protected 2, and thus it is possible to detect whether a flame occurs within a preset distance range at each of the four diagonal locations on the top wall 22*b* of the working region 21*b* of the device to be protected 2.

In some embodiments, each flame sensor 141 has a cone-shaped detection range and is configured to obtain flame sensing data within a preset distance range. Therefore, when many flame sensors 141 among the four flame sensors 141 detect a flame, it indicates that a fire area is relatively large; or conversely, when relatively few flame sensors 141 among the four flame sensors 141 detect a flame, it indicates that a fire area is relatively small. In addition, a fire origin location can be determined according to a location(s) of a flame sensor(s) 141 that detects a flame among the four flame sensors 141. Therefore, a size of the fire area can be determined according to the number of the flame sensor(s) 141 that detects a flame, and in turn, the first controller 13*a* can determine at least one of the fire area or the fire origin location according to flame sensing data detected by the four flame sensors 141.

In other embodiments, the flame sensor 141 is implemented as five flame sensors 141, where four of the flame sensors 141 are spaced apart on four inner side walls of the working region 21*b* of the device to be protected 2, and another flame sensor 141 is disposed on the top wall 22*b* of the working region 21 of the device to be protected 2.

Therefore, flame sensors 141 can be disposed at different locations in the working region 21*b* of the device to be protected 2, to realize detection of fire areas at different locations and/or a fire origin location(s) in the working region 21*b* of the device to be protected 2.

In some embodiments, referring to FIG. 11 again, the sensor 14 further includes a laser head sensor 142. The laser head sensor 142 is implemented as at least one laser head sensor 142. The laser head sensor 142 can obtain both real-time temperature data and real-time flame sensing data in the working region 21*b*. In some embodiments, the laser head sensor 142 is disposed on a side wall of a laser head 23 of the device to be protected 2 to sense whether the working region 21*b* of the device to be protected 2 is on fire. It may be understood that in other embodiments, the laser head sensor 142 may be disposed at other locations of the device to be protected 2, which is not limited herein.

Therefore, in the disclosure, whether there is a fire in the working region 21*b* of the device to be protected 2 can be more accurately determined by cooperation of the flame sensor 141 and the laser head sensor 142, thereby reducing a misjudgment probability. Furthermore, in the case that the flame sensor 141 is in failure, detection of whether there is a fire can be detected by the laser head sensor 142, thereby realizing double insurance.

In some embodiments, referring to FIG. 8 again, the external fire extinguishing system 1*a* further includes a cable 15. The sensor 14 is connected to the first controller 13*a* via the cable 15, thereby realizing communication connection between the sensor 14 and the first controller 13*a*.

Figure 13:
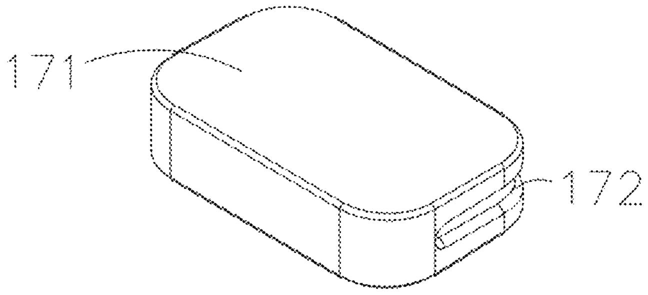
FIG. 13 is a schematic structural view of a wire fixing block in an embodiment of the disclosure.

In some embodiments, referring to FIG. 13, the external fire extinguishing system 1*a* further includes multiple wire fixing blocks 17. The cable 15 is fixed to the inner wall of the working region 21*b* of the device to be protected 2 via the wire fixing blocks 17.

In some embodiments, the wire fixing block 17 includes a wire fixing body 171 and a clamping groove 172 defined in the wire fixing body 171. The clamping groove 172 is elastically deformable and thus can clamp the cable 15.

In some embodiments, the wire fixing body 171 can be adhered to the inner wall of the working region 21*b* of the device to be protected 2 by means of adhesion. The clamping groove 172 is a V-shaped groove defined on a side surface with a small area of the wire fixing body 171. The clamping groove 172 is elastically deformable and thus can clamp the cable 15. In other embodiments, the wire fixing body 171 can be connected to the inner wall of the working region 21*b* of the device to be protected 2 by means of snap-fit connection or threaded connection, etc., which is not limited herein.

Figure 14:
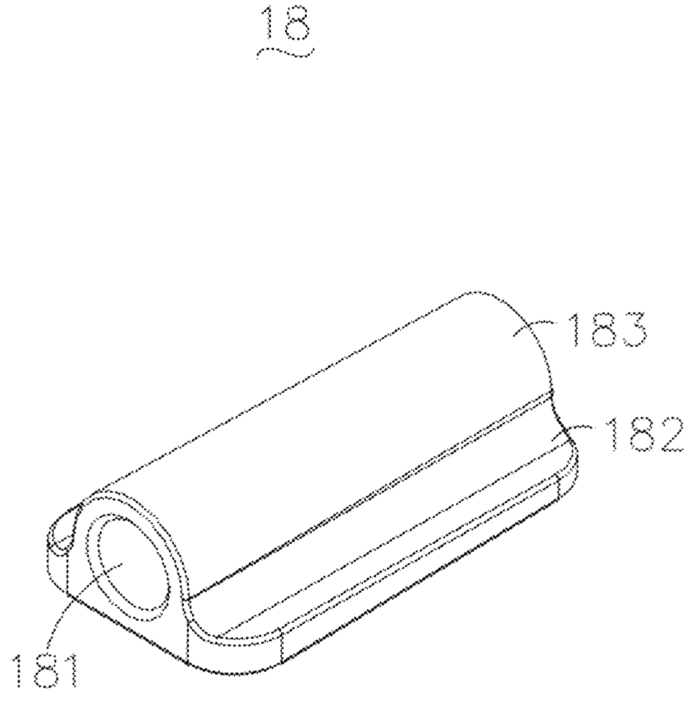
FIG. 14 is a schematic structural view of an air pipe clamp in an embodiment of the disclosure.

In some embodiments, referring to FIG. 14, the external fire extinguishing system 1*a* further includes an air pipe clamp 18. The air pipe clamp 18 is disposed in the device to be protected 2. The air pipe clamp 18 defines a perforation 181. The air pipe 12*a* is fixed to an inner wall of the device to be protected 2 by passing through the perforation 181.

In some embodiments, the air pipe clamp 18 includes an adhesion portion 182 and a penetration portion 183. The penetration portion 183 is disposed on one side of the adhesion portion 182. The adhesion portion 182 is configured to be adhered to an inner side wall of the device to be protected 2. The perforation 181 is defined on the penetration portion 183.

In some embodiments, the adhesion portion 182 may be adhered to the inner wall of the working region 21*b* of the device to be protected 2 by means of adhesion. It may be understood that in other embodiments, the adhesion portion 182 may be connected to the inner wall of the working region 21*b* of the device to be protected 2 by means of snap-fit connection or threaded connection, etc., which is not limited herein.

In some embodiments, referring to FIG. 11 and FIG. 8 again, the external fire extinguishing system 1*a* includes a second controller 16. The first controller 13*a* is disposed within the external housing 111*a* and in electrical connection with the piercing apparatus 10. The second controller 16 is disposed outside the device to be protected 2. The first controller 13*a* is in communication connection with the second controller 16. The second controller 16 is in communication connection with each of multiple sensors 14.

Therefore, a more convenient control and cable arrangement can be realized through the communication connection between the first controller 13*a* and the second controller 16, as well as communication connection between the second controller 16 and each of the multiple sensors 14.

It may be understood that in other embodiments, the first controller 13*a* may also be located outside the external housing 111*a* and in electrical connection or communication connection with the fire extinguishing apparatus 100, which is not limited herein.

In some embodiments, the cable 15 includes a first cable 151. The first controller 13*a* is in electrical connection with the second controller 16 via the first cable 151.

Therefore, the first controller 13*a* is in electrical connection with the second controller 16 via the first cable 151, so that clutter caused by multiple connections of multiple wires can be avoided.

In some embodiments, the cable 15 further includes second cables 152. The second controller 16 is in electrical connection with the multiple sensors 14 via the multiple second cables 152, respectively.

Therefore, the multiple second cables 152 respectively connected to the multiple sensors 14 do not have to be directly connected to the fire extinguishing apparatus 100, so that the number of cables directly connected to the fire extinguishing apparatus 100 can be reduced, and clutter caused by too many cables can be avoided.

Figure 15:
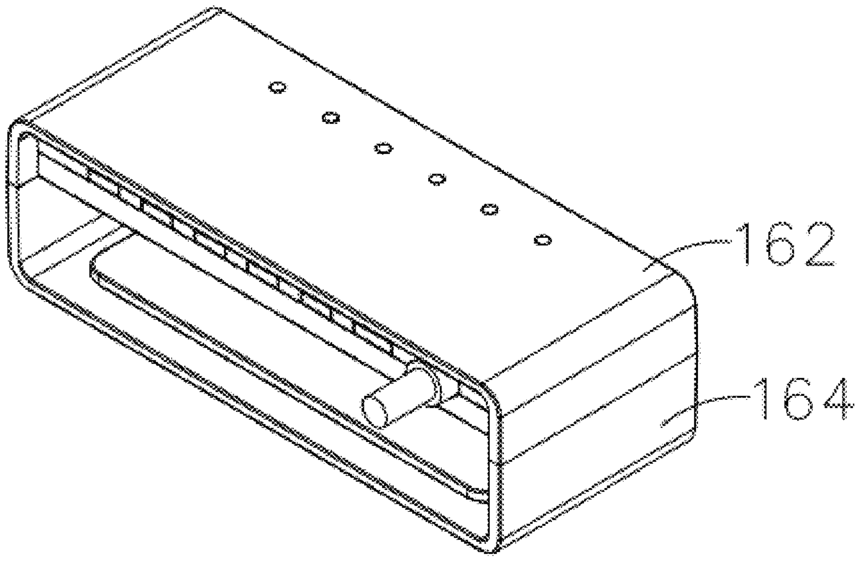
FIG. 15 is a schematic structural view of a control box in an embodiment of the disclosure.
Figure 16:
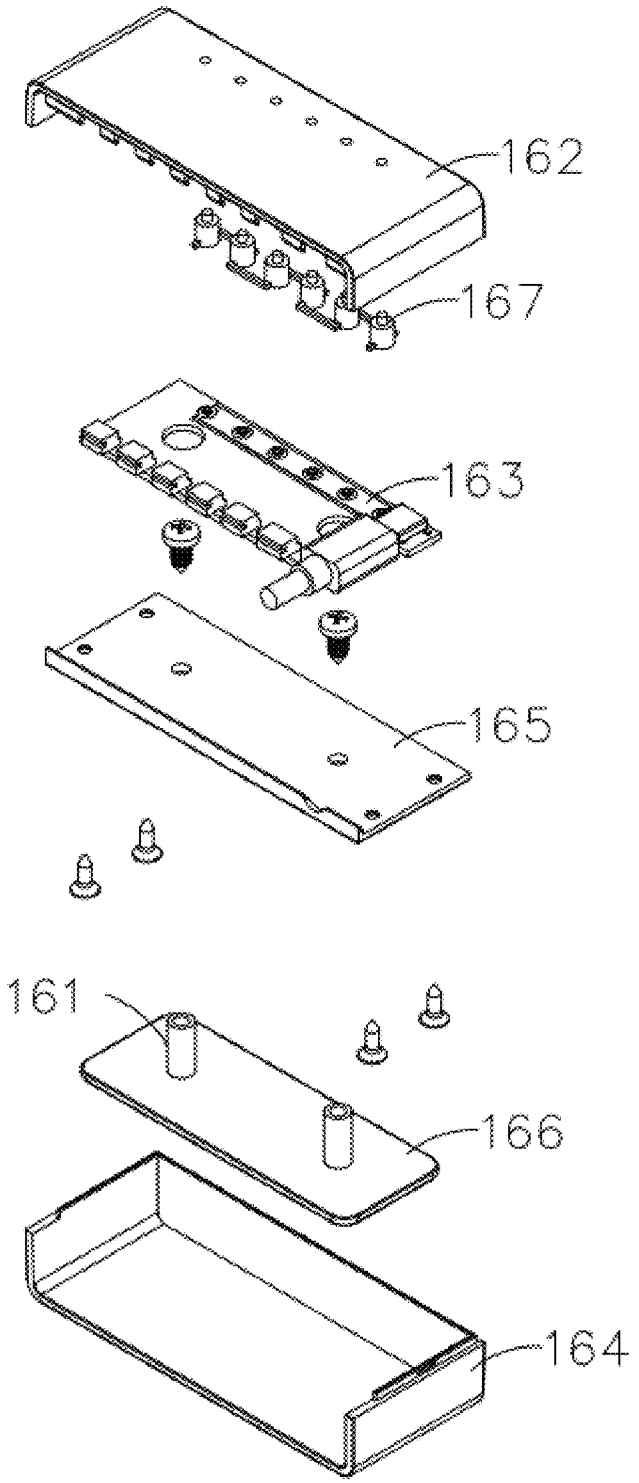
FIG. 16 is an exploded schematic view of a control box in an embodiment of the disclosure.

In some embodiments, referring to FIG. 15 and FIG. 16 together, the external fire extinguishing system 1*a* further includes a control box 160. The second controller 16 is disposed within the control box 160. The control box 160 has a wire winding post 161 therein. Excess part of the first cable 151 that connects the first controller 13*a* and the second controller 16 is wound on the wire winding post 161.

Therefore, clutter caused by the overlong first cable 151 can be avoided.

In some embodiments, the control box 160 is configured to be fixed to an outer side wall of the device to be protected 2.

Therefore, locational certainty and portability between the control box 160 and the device to be protected 2 can be increased.

Figure 17:
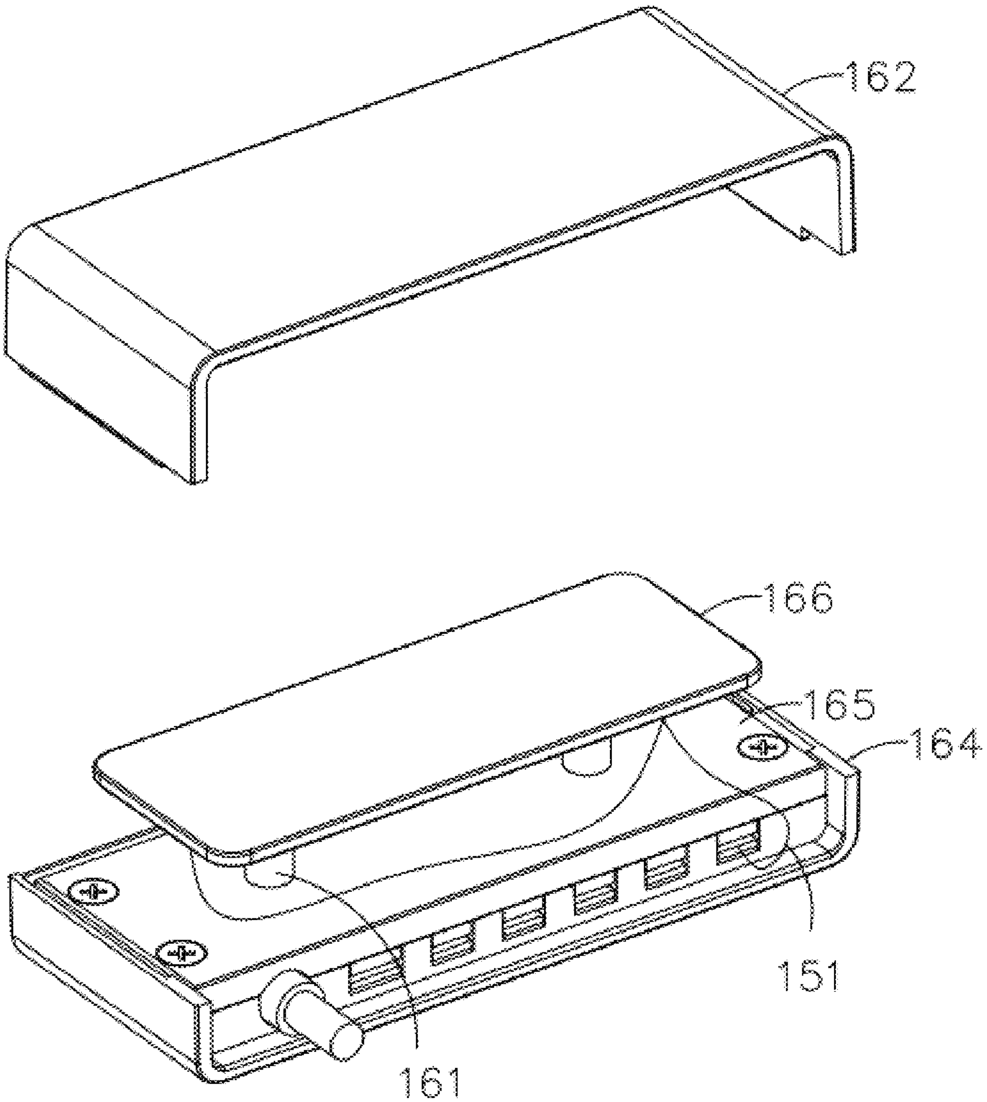
FIG. 17 is an exploded schematic view of a control box in an embodiment of the disclosure.

In some embodiments, referring to FIG. 15, FIG. 16, and FIG. 17, the control box 160 includes a lower cover 162, a main control board 163, and an upper cover 164. The main control board 163 is disposed between the lower cover 162 and the upper cover 164. The second controller 16 is disposed on the main control board 163.

In some embodiments, the main control board 163 is further provided with a microcontroller unit (MCU) light guide 167.

In some embodiments, the control box 160 further includes a center plate 165 and an upper plate 166. The main control board 163 is disposed between the lower cover 162 and the center plate 165. The upper plate 166 and the center plate 165 are spaced apart from each other. The upper plate 166 is provided with the wire winding post 161 on a side facing the center plate 165, and a wire winding space is defined between the upper plate 166, the center plate 165, and the wire winding post 161. The upper cover 164 is covered on the upper plate 166. Excess part of the first cable 151 that connects the control box 160 with the fire extinguishing apparatus 100 is wound on the wire winding post 161.

In some embodiments, the wire winding post 161 may be implemented as one or more wire winding posts. In the embodiment, the wire winding post 161 is implemented as two wire winding posts spaced apart. In other embodiments, the wire winding post 161 is an elongated wire winding post.

Therefore, the wire winding post 161 is configured to wind excess part of the first cable 151, thereby reducing clutter caused by the cable.

Referring to FIGS. 15 to 17 together, the center plate 165 divides a space between the lower cover 162 and the upper cover 164 into two spaces. A space defined between the center plate 165 and the lower cover 162 is configured to receive the main control board 163, and a space defined between the center plate 165 and the upper cover 164 is configured to receive the upper plate 166, and thus the wire winding space is defined.

In some embodiments, the air pipe 12*a* and the second cable 152 enter the working region 21*b* of the device to be protected 2 through openings in the device to be protected 2.

In some embodiments, the air pipe 12*a* and the second cable 152 enter the working region 21*b* of the device to be protected 2 through openings on a bottom or on a side of the device to be protected 2.

In some embodiments, the air pipe 12*a* and the second cable 152 enter the working region 21*b* of the device to be protected 2 through different openings. In other embodiments, the air pipe 12*a* and the second cable 152 enter the working region 21*b* of the device to be protected 2 through the same opening.

Figure 18:
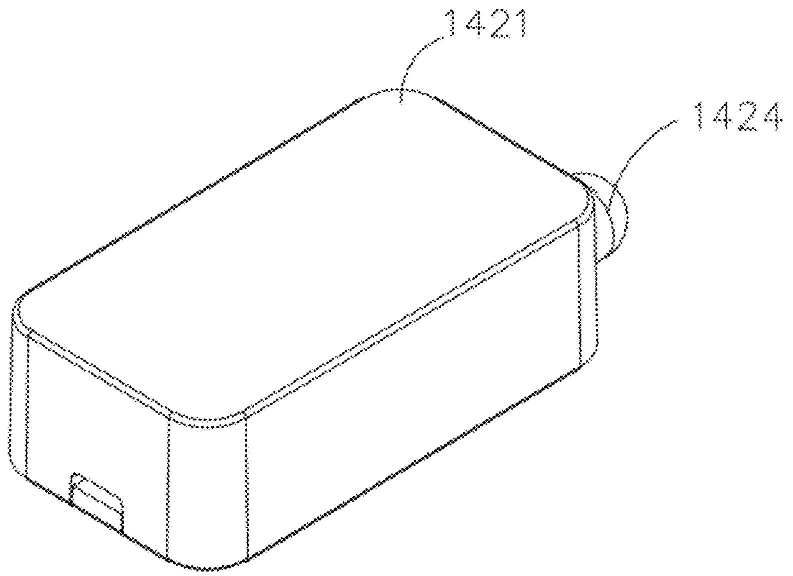
FIG. 18 is a schematic structural view of a laser head sensor in an embodiment of the disclosure.
Figure 19:
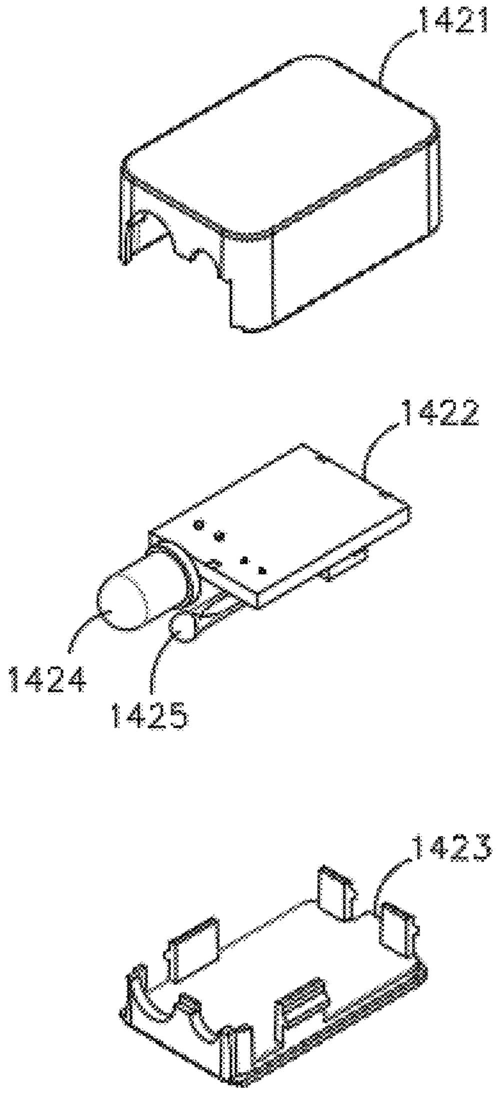
FIG. 19 is an exploded schematic view of a laser head sensor in an embodiment of the disclosure.

Referring to FIG. 18 and FIG. 19, the laser head sensor 142 includes a first upper housing 1421, a first circuit board 1422, a first lower housing 1423, and a flame sensor probe 1424, and a temperature detector probe 1425. The flame sensor probe 1424 and the temperature detector probe 1425 are disposed at one side of the first circuit board 1422. The first circuit board 1422 is disposed between the first upper housing 1421 and the first lower housing 1423. The flame sensor probe 1424 and the temperature detector probe 1425 are disposed between the first upper housing 1421 and the first lower housing 1423 and extend from the first upper housing 1421 and the first lower housing 1423.

It may be understood that in the embodiment, there are four flame sensors 141 and one laser head sensor 142. The flame sensor probe 1424 is equivalent to a flame sensor, and the temperature detector probe 1425 is equivalent to a temperature detector. Therefore, the external fire extinguishing system 1*a* includes five flame sensors and one temperature detector totally. Each detector of the six detectors obtains environmental data of its surroundings, and determines whether a fire occurs in the vicinity of the detector according to a detection threshold corresponding to the detector.

Figure 20:
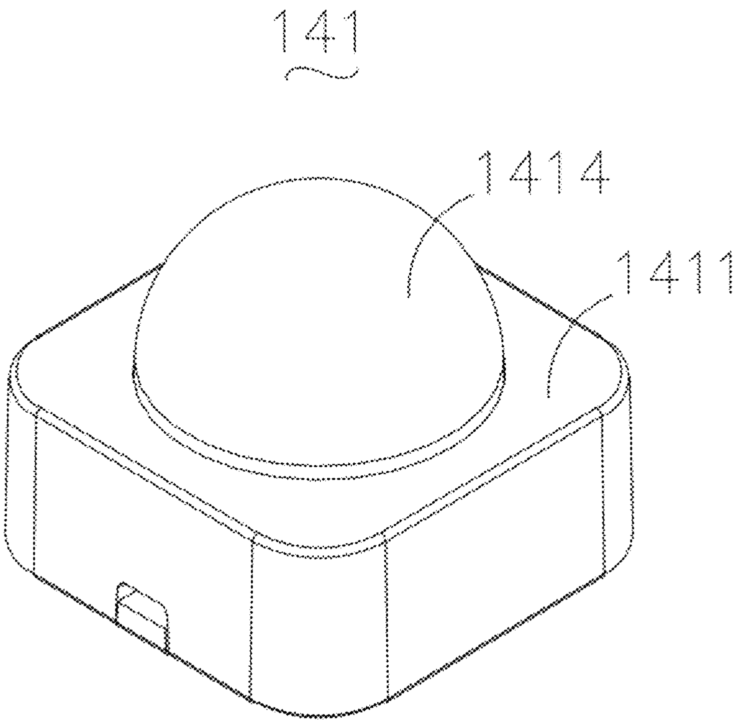
FIG. 20 is a schematic structural view of a flame sensor in an embodiment of the disclosure.
Figure 21:
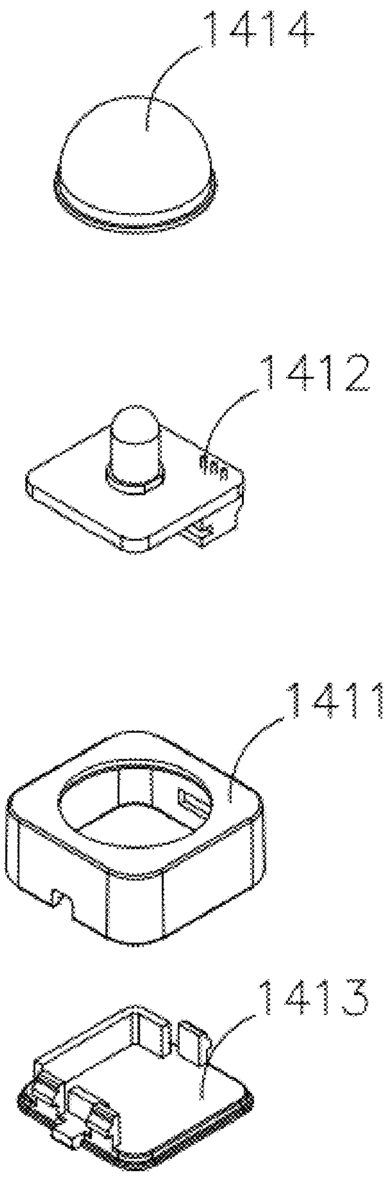
FIG. 21 is an exploded schematic view of a flame sensor in an embodiment of the disclosure.

Referring to FIG. 20 and FIG. 21, the flame sensor 141 includes a second upper housing 1411, a second circuit board 1412, a second lower housing 1413, and a lens 1414 disposed on one side of the second circuit board 1412 and protruding from the second upper housing 1411.

In some embodiments, referring to FIG. 8 again, the external fire extinguishing system 1*a* further includes a power switch 19, and the external fire extinguishing system 1*a* further includes a third cable 191. The power switch 19 is in electrical connection with the device to be protected 2 via the third cable 191. The power switch 19 is configured to be plugged into a socket of a power supply. The power switch 19 may be in wireless communication connection with the device to be protected 2, which is not limited herein.

In some embodiments, referring to FIG. 8 again, the power switch 19 is provided with a switching button 192. When the switching button 192 is on, the power supply is in conduction with the device to be protected 2 via the power switch 19. When the switch button 192 is off, the power supply is disconnected from the device to be protected 2 via the power switch 19.

In other embodiments, the power switch 19 is in wireless communication connection with the fire extinguishing apparatus 100. The power switch 19 is further provided with a communication module, and the fire extinguishing apparatus 100 is provided with a communication module, and thus the power switch 19 may be in communication connection with the fire extinguishing apparatus 100. Therefore, the fire extinguishing apparatus 100 can send a power-off command to the power switch 19, and in response to the power-off command, the electrical connection between the power supply and the device to be protected 2 may be disconnected via the power switch 19.

Figure 22:
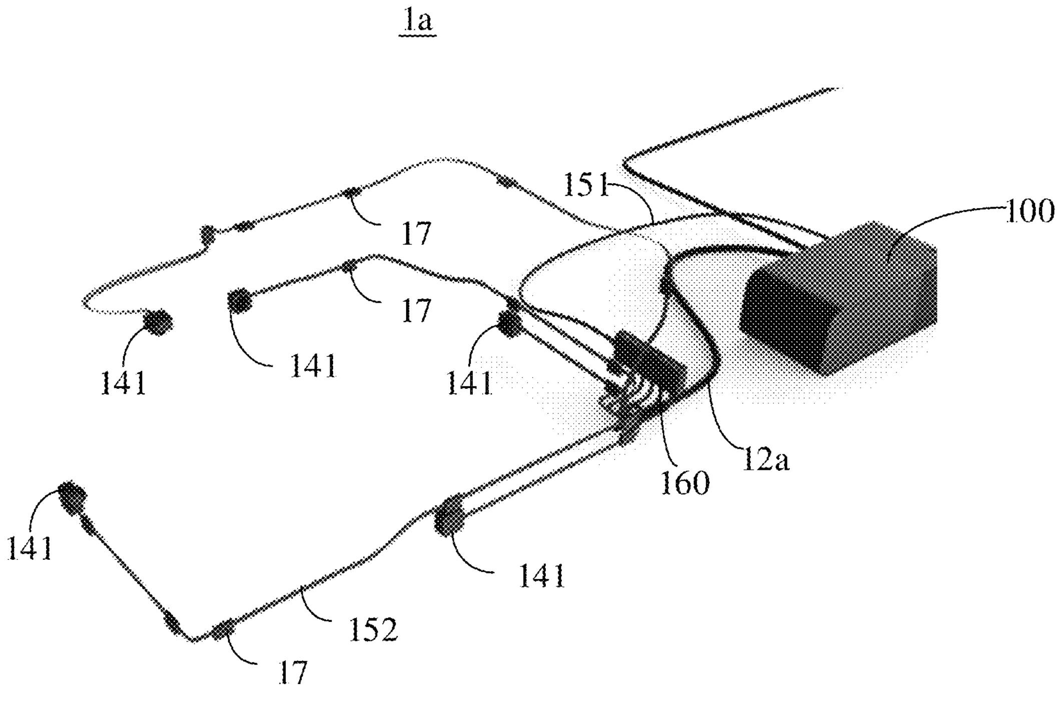
FIG. 22 is a schematic structural view of a fire extinguishing system in another embodiment of the disclosure.
Figure 23:
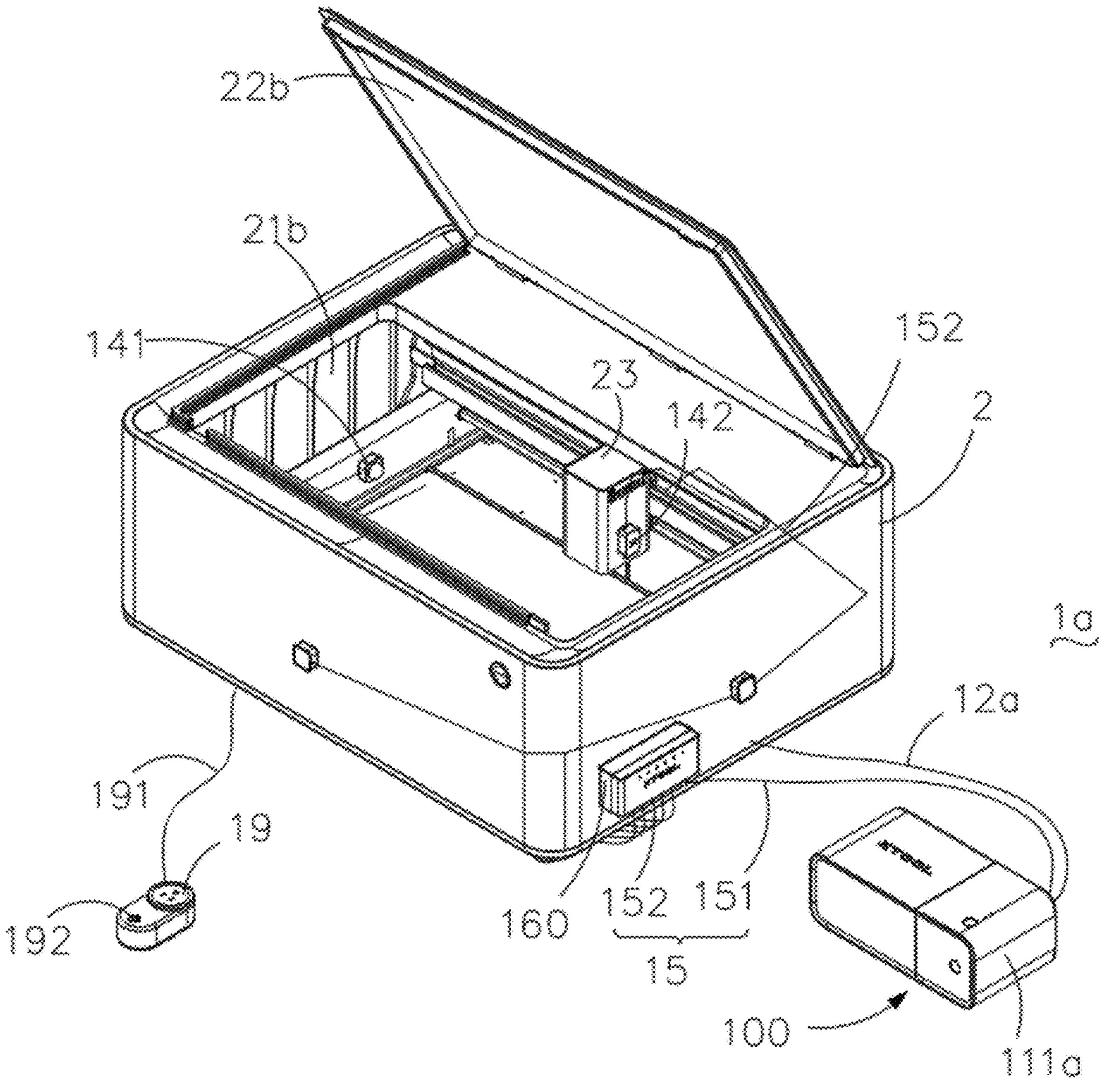
FIG. 23 is a schematic structural view of a fire extinguishing system and a device to be protected in another embodiment of the disclosure.

Refer to FIG. 22 and FIG. 23, where both FIG. 22 and FIG. 23 are a schematic structural view of an external fire extinguishing system 1*a* in another embodiment of the disclosure.

Unlike the foregoing embodiments, in this embodiment, there are five flame sensors 141, where four flame sensors 141 are spaced apart on the four inner side walls of the working region 21*b* of the device to be protected 2, and another flame sensor 141 is disposed on a side wall of the laser head 23 of the device to be protected 2.

In the embodiment, there are five second cables 152. One end of each second cable 152 is connected to the flame sensor 141 and the other end is connected to the control box 160, and each second cable 152 is correspondingly provided with at least one wire fixing block 17, thereby fixing the second cables 152 to the inner side walls of the working region 21*b* of the device to be protected 2.

It may be understood that the five second cables 152 are different in length due to different locations of the five flame sensors 141 on the inner wall of the working region 21*b* of the device to be protected 2.

In some embodiments, the device to be protected 2 may be, but is not limited to, an open laser processing device, an enclosed laser processing device, etc.

Embodiments of the disclosure further provide a computer-readable storage medium. The computer-readable storage medium stores computer programs. The computer programs are configured to be invoked by a processor to implement the fire extinguishing control method provided in any one of the foregoing embodiments.

It may be understood by those of ordinary skill in the art that all or a part of the various methods of the embodiments described above may be accomplished by means of a program to instruct associated hardware, and the program may be stored in a computer-readable memory, which may include a flash disk, a read-only memory (ROM), a random access memory (RAM), a magnetic disk, or an optical disk.

In the foregoing embodiments, the description of each implementation has its own emphasis. For the parts not described in detail in one implementation, reference may be made to related descriptions in other embodiments.

The above embodiments are merely part of embodiments of the disclosure. It may be noted that, improvements and modifications may also be made by those skilled in the art without departing from the principle of the disclosure, and these improvements and modifications shall also belong to the scope of protection of the disclosure.

What is claimed is:

1. A fire extinguishing control method, applied to a fire extinguishing system, wherein the fire extinguishing system comprises a fire extinguishing apparatus, the fire extinguishing system is configured to extinguish a fire in a device to be protected, and the fire extinguishing control method comprises:

- obtaining flame feature data of at least one preset portion of the device to be protected;
- determining a processing mode of the fire extinguishing apparatus according to the flame feature data of the at least one preset portion, in response to determining presence of a flame according to the flame feature data of the at least one preset portion; and
- controlling the fire extinguishing apparatus to perform a corresponding operation according to the determined processing mode;
- wherein determining the processing mode of the fire extinguishing apparatus according to the flame feature data in response to determining the presence of the flame comprises:
  - determining at least one of a size of the flame or a fire origin location according to the flame feature data in response to determining the presence of the flame; and
  - determining the processing mode of the fire extinguishing apparatus according to at least one of the size of the flame or the fire origin location;
- wherein determining the processing mode of the fire extinguishing apparatus according to the size of the flame comprises:
  - determining that the processing mode of the fire extinguishing apparatus is only alarming in response to the size of the flame being in a first preset range of values; and
  - determining that the processing mode of the fire extinguishing apparatus is alarming and fire extinguishing in response to the size of the flame being in a second preset range of values, wherein a maximum value in the first preset range of values is less than a minimum value in the second preset range of values.

2. The fire extinguishing control method of claim 1, wherein determining the processing mode of the fire extinguishing apparatus according to the fire origin location comprises:

- determining that the processing mode of the fire extinguishing apparatus is alarming and fire extinguishing in response to the fire origin location being a core location; and
- determining that the processing mode of the fire extinguishing apparatus is only alarming in response to the fire origin location being an edge location.

3. The fire extinguishing control method of claim 1, wherein determining the processing mode of the fire extinguishing apparatus according to the size of the flame and the fire origin location comprises:

- determining that the processing mode of the fire extinguishing apparatus is only alarming in response to the fire origin location being an edge location and the size of the flame being in a first preset range of values; and
- determining that the processing mode of the fire extinguishing apparatus is alarming and fire extinguishing, in response to the fire origin location being a core location and the size of the flame being in the first preset range of values, or in response to the fire origin location being a core location and the size of the flame being in a second preset range of values, or in response to the fire origin location being an edge location and the size of the flame being in the second preset range of values; wherein a maximum value in the first preset range of values is less than a minimum value in the second preset range of values.

4. The fire extinguishing control method of claim 1, wherein the device to be protected comprises a plurality of different preset portions, and obtaining the flame feature data of the at least one preset portion of the device to be protected comprises:

- obtaining the flame feature data of the plurality of preset portions of the device to be protected;
- wherein determining at least one of the size of the flame or the fire origin location according to the flame feature data comprises:
  - determining at least one of the size of the flame or the fire origin location according to the flame feature data of the plurality of preset portions.

5. The fire extinguishing control method of claim 1, further comprising:

- determining a dose of flame retardant of the fire extinguishing system according to the determined size of the flame in response to the processing mode comprising any one of fire extinguishing and both alarming and fire extinguishing; and controlling the fire extinguishing apparatus to perform the corresponding operation according to the determined processing mode and the determined dose of the flame retardant.

6. The fire extinguishing control method of claim 1, wherein the flame is classified into a 1-level flame, a 2-level flame, a 3-level flame, and a 4-level flame in size, and the 1-level flame>the 2-level flame>the 3-level flame>the 4-level flame in size; a sensitivity of the fire extinguishing apparatus is classified into first-level sensitivity and second-level sensitivity, and the fire extinguishing apparatus in the first-level sensitivity is more sensitive than the fire extinguishing apparatus in the second-level sensitivity; wherein determining the processing mode of the fire extinguishing apparatus according to the size of the flame further comprises:

determining that the processing mode of the fire extinguishing apparatus is only alarming in response to the flame being the 4-level flame and the fire extinguishing apparatus being in the first-level sensitivity;

determining that the processing mode of the fire extinguishing apparatus is alarming and fire extinguishing in response to the fire extinguishing apparatus being in the first-level sensitivity and the flame being the 1-level flame, the 2-level flame, or the 3-level flame;

determining that the processing mode of the fire extinguishing apparatus is only alarming in response to the fire extinguishing apparatus being in the second-level sensitivity and the flame being the 3-level flame or the 4-level flame; and determining that the processing mode of the fire extinguishing apparatus is alarming and fire extinguishing in response to the fire extinguishing apparatus being in the second-level sensitivity and the flame being the 1-level flame or the 2-level flame.

7. The fire extinguishing control method of claim 1, wherein controlling the fire extinguishing apparatus to perform the corresponding operation according to the determined processing mode comprises:

in response to the determined processing mode being alarming and fire extinguishing, generating an alarm for a preset duration, and controlling the fire extinguishing apparatus to perform fire extinguishing in response to no reception of a fire-extinguishing canceling signal within the preset duration; or in response to the determined processing mode being alarming and fire extinguishing, generating the alarm and controlling the fire extinguishing apparatus to perform fire extinguishing.

8. The fire extinguishing control method of claim 1, wherein the flame feature data comprises at least one of flame sensing data or temperature sensing data, and obtaining the flame feature data of the at least one preset portion of the device to be protected comprises:

obtaining at least one of the flame sensing data or the temperature sensing data of the at least one preset portion of the device to be protected;

wherein determining the presence of the flame according to the flame feature data of the at least one preset portion comprises:

determining the presence of the flame according to at least one of the flame sensing data or the temperature sensing data of the at least one preset portion.

9. The fire extinguishing control method of claim 8, wherein determining the presence of the flame according to the flame sensing data of the at least one preset portion comprises:

performing averaging processing and filtering processing on a plurality of flame sensing data of each of the at least one preset portion; and determining the presence of the flame according to a maximum value and a minimum value in the processed data.

10. The fire extinguishing control method of claim 9, wherein performing the averaging processing and the filtering processing on the plurality of flame sensing data of each of the at least one preset portion comprises:

performing the averaging processing on the plurality of flame sensing data of each of the at least one preset portion to obtain a mean; and performing the filtering processing on the mean to obtain a filtered value.

11. The fire extinguishing control method of claim 9, wherein determining the presence of the flame according to the maximum value and the minimum value in the processed data comprises:

plotting a plurality of data subject to the averaging processing and the filtering processing into a curve graph; and determining the presence of the flame in response to a difference between the maximum value and the minimum value in the curve graph being greater than a preset value.

12. A fire extinguishing system, configured to extinguish a fire in a device to be protected and comprising a controller, a flame-feature-data detector, and a fire extinguishing apparatus, wherein the flame-feature-data detector is disposed on each of different portions of the device to be protected, and both the flame-feature-data detector and the fire extinguishing apparatus are in electrical connection with the controller; wherein the controller is configured to perform the fire extinguishing control method of claim 1.

13. A fire extinguishing protection system, comprising a fire extinguishing system of claim 12 and a device to be protected, wherein the device to be protected is a laser processing device, the fire extinguishing system is configured to extinguish a fire in the device to be protected, the fire extinguishing system comprises a controller, a flame-feature-data detector, and a fire extinguishing apparatus, the flame-feature-data detector is disposed on each of different portions of the device to be protected, and both the flame-feature-data detector and the fire extinguishing apparatus are in electrical connection with the controller; wherein the controller is configured to obtain flame feature data detected by at least one flame-feature-data detector; determine a processing mode of the fire extinguishing apparatus according to the flame feature data detected by the at least one flame-feature-data detector, in response to determining presence of a flame according to the flame feature data; and control the fire extinguishing apparatus to perform a corresponding operation.

14. A non-transitory computer-readable storage medium, configured to store computer programs that are configured to be invoked by a controller to perform the fire extinguishing control method of claim 1.

15. The non-transitory computer-readable storage medium of claim 14, wherein in terms of determine the processing mode of the fire extinguishing apparatus according to the flame feature data in the case that presence of the flame is determined, the computer programs are configured to be invoked by the controller to:

determine at least one of a size of the flame or a fire origin location according to the flame feature data response to determining the presence of the flame; and determine the processing mode of the fire extinguishing apparatus according to at least one of the size of the flame or the fire origin location.

16. The non-transitory computer-readable storage medium of claim 15, wherein in terms of obtain the flame feature data of the at least one preset portion of the device to be protected, the computer programs are configured to be invoked by the controller to:

obtain the flame feature data of the plurality of preset portions of the device to be protected; and in terms of determining at least one of the size of the flame or the fire origin location according to the flame feature data, the computer programs are configured to be invoked by the controller to:

determine at least one of the size of the flame or the fire origin location according to the flame feature data of the plurality of preset portions.

17. The non-transitory computer-readable storage medium of claim 15, wherein the computer programs are further configured to be invoked by the controller to:

determine a dose of flame retardant of the fire extinguishing system according to the determined size of the flame in the case that the processing mode comprises any one of fire extinguishing and both alarming and fire extinguishing; and control the fire extinguishing apparatus to perform the corresponding operation according to the determined processing mode and the determined dose of the flame retardant.

* * * * *